(12) United States Patent
Elprin et al.

(10) Patent No.: US 11,763,201 B1
(45) Date of Patent: *Sep. 19, 2023

(54) SYSTEM AND METHODS FOR MODEL MANAGEMENT

(71) Applicant: Domino Data Lab, Inc., San Francisco, CA (US)

(72) Inventors: Nicholas Elprin, San Francisco, CA (US); Christopher Yang, Cuptertino, CA (US); Madhavan Thirumalai, San Francisco, CA (US)

(73) Assignee: Domino Data Lab, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,185

(22) Filed: Mar. 23, 2022

Related U.S. Application Data

(63) Continuation of application No. 16/529,518, filed on Aug. 1, 2019, now Pat. No. 11,315,039.

(60) Provisional application No. 62/714,580, filed on Aug. 3, 2018.

(51) Int. Cl.
*G06N 20/00* (2019.01)
*G06F 8/60* (2018.01)
*G06F 3/04847* (2022.01)

(52) U.S. Cl.
CPC ............. *G06N 20/00* (2019.01); *G06F 8/60* (2013.01); *G06F 3/04847* (2013.01)

(58) Field of Classification Search
CPC ........ G06N 20/00; G06F 8/60; G06F 3/04847
See application file for complete search history.

(56) References Cited

U.S. PATENT DOCUMENTS

2015/0379429 A1 * 12/2015 Lee .................... G09B 5/00
706/11

* cited by examiner

*Primary Examiner* — Pei Yong Weng
(74) *Attorney, Agent, or Firm* — Wilson Sonsini Goodrich & Rosati

(57) ABSTRACT

Improved systems and methods for improved management of models for data science can facilitate seamless collaboration of data science teams and integration of data science workflows. Systems and methods provided herein can provide an open, unified platform to build, validate, deliver, and monitor models at scale. Systems and methods of the present disclosure may accelerate research, spark collaboration, increase iteration speed, and remove deployment friction to deliver impactful models. In particular, users may be allowed to visualize statistics about models and monitor models in real-time via a graphical user interface provided by the systems.

17 Claims, 23 Drawing Sheets

Runs

| NAME | CATEGORY | MCC | AUC | PRECISION | RECALL | F1 | ACCURACY | RULES |
|------|----------|------|------|-----------|--------|------|----------|-------|
| PL w SM Meta | Logistic Regression | 0.938 | 0.999 | 0.914 | 0.913 | 0.914 | 91% | Data Drift Rule |
| PL w SM 2017 | Logistic Regression | 0.919 | 0.988 | 0.960 | 0.917 | 0.944 | 94% | Model Perf Rule |
| AL w SM 2017 | Logistic Regression | 0.990 | 0.937 | 0.970 | 0.915 | 0.960 | 96% | |
| AL w SM 2016 | Logistic Regression | 0.980 | 0.934 | 0.935 | 0.956 | 0.923 | 92% | 3 rules applied |

SYSTEM AND METHODS FOR MODEL MANAGEMENT

CROSS-REFERENCE

This application is a continuing application of U.S. patent application Ser. No. 16/529,518. Filed Aug. 1, 2018, which claims the benefit of U.S. Provisional Application No. 62/714,580, filed Aug. 3, 2018, which application is incorporated herein by reference in its entirety.

BACKGROUND

Models are the central output of data science, and they have tremendous power to transform companies, industries and society. Models are algorithms whose instructions are induced from a set of data and are then used to make predictions, recommendations, or prescribe an action based on a probabilistic assessment.

Companies use models to create new products and drive ongoing operational improvement. Companies may need to develop organizational capability to manage models to enable the companies to reliably and securely develop, validate, deliver and monitor models. Conventionally, only production models are monitored which limit the capability of managing models at scale.

SUMMARY

Recognized herein is a need for improved systems and methods for management of models for data science to facilitate seamless collaboration of data science teams and integration of data science workflows. Systems and methods provided herein can provide an open, unified platform to build, validate, deliver, and monitor models at scale. Systems and methods of the present disclosure may accelerate research, spark collaboration, increase iteration speed, and remove deployment friction to deliver impactful models. In particular, users may visualize statistics about models and monitor models in real-time via a graphical user interface provided by the systems.

In one aspect of the invention, a system is provided for machine learning model management. The system may comprise: one or more computer processors that are programmed to provide an application comprising: (i) a first software module for capturing multiple components related to a training and deployment process of a plurality of machine learning models; and (ii) a second software module configured to generate a graph indicating an impact of the multiple components across the plurality of machine learning models, wherein the graph is dynamically displayed within a graphical user interface; and an electronic display with the graphical user interface comprising (i) one or more interactive elements for receiving a user input; and (ii) the graph indicating the impact of the multiple components across the plurality of machine learning models.

In some embodiments, the multiple components comprise at least a computing environment and one or more training datasets. In some embodiments, the system may further comprise a third software module configured to detect a drift of each of the plurality of machine learning models. In some cases, the drift of each of the plurality of machine learning models comprises a drift in a dataset or a drift in model performance. In some cases, the drift of each of the plurality of machine learning models is detected based on a set of user-defined rules. For example, the electronic display of the system is configured to accept the set of user-defined rules via the one or more interactive elements. In some embodiments, the system may further comprise a fourth software module configured to generate a usage pattern for each of the machine learning models and display the usage pattern within the graphical user interface.

In some embodiments, the graph is a model dependency graph that shows the multiple components and mappings across models. In some cases, the model dependency graph displays models as nodes and data as arcs. In some embodiments, the statistics relating to a number of reused components, revisions per month, or insights created are displayed along with the graph on the graphical user interface.

In a related yet separate aspect, a method is provided method for machine learning model management. The method may comprise: capturing, with aid of a first software module, multiple components related to a training and deployment process of a plurality of machine learning models; generating, with aid of a second software module, a graph indicating an impact of the multiple components across the plurality of machine learning models; and dynamically displaying the graph within a graphical user interface, wherein the graphical user interface comprises (i) one or more interactive elements for receiving a user input; and (ii) the graph.

In some embodiments, the method further comprises detecting a drift of each of the plurality of machine learning models. In some cases, the drift of each of the plurality of machine learning models comprises a drift in a dataset or a drift in model performance. In some cases, the drift of each of the plurality of machine learning models is detected based on a set of user-defined rules. In some cases, the method further comprises generating a usage pattern for each of the machine learning models and displaying the usage pattern within the graphical user interface.

In some embodiments, the graph is a model dependency graph showing the multiple components and mappings across models. In some embodiments, the method further comprises displaying statistics relating to a number of reused components, revisions per month, or insights created along with the graph on the graphical user interface.

In another aspect of the invention, a system for managing a plurality of machine learning models is provided. The system may comprise: an electronic display with a graphical user interface comprising: (i) one or more interactive elements for receiving an user input indicating one or more edits to a rule for viewing statistics about one or more of the plurality of models, and (ii) a result visualization region for dynamically displaying a result of the statistics in response to receiving the one or more edits; and one or more computer processors that are programmed to provide an application comprising: (i) a first software module configuring the graphical user interface for providing statistics about an execution of a selected model and a linkage between the execution of the selected model and a selected version of the model developed on the system; and (ii) a second software module configuring the graphical user interface for displaying statistics about a usage and cost of the plurality of models.

In some embodiments, the statistics about the one or more plurality of models comprises a number of reused components, revisions per month, or insights created. In some embodiments, the application further comprises a third software module configured to detect a drift of each of the plurality of machine learning models.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 21A-C show exemplary GUIs for displaying information related to model data drift and model performance drift.

DETAILED DESCRIPTION

Figure 1:
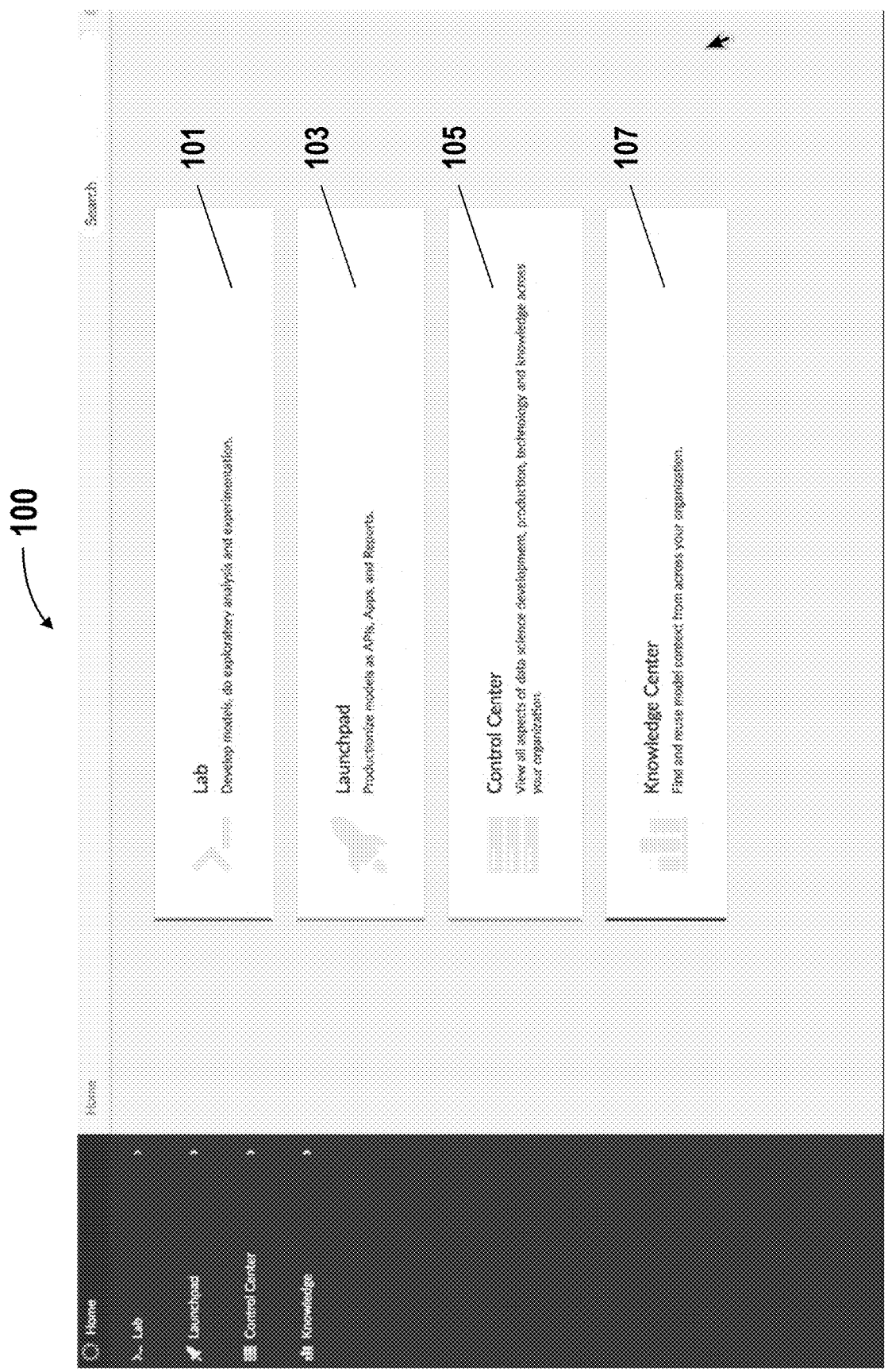
FIG. 1 shows an example of a system for managing models, in accordance with embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides improved systems and methods for management of models. Model management systems and methods provided herein can provide an open, unified platform to build, validate, deliver, and monitor models at scale. The provided model management systems and methods may accelerate research, spark collaboration, increase iteration speed, and remove deployment friction to deliver impactful models. In particular, users may be permitted to view statistics about models and monitor models in real-time via a graphical user interface provided by the systems. It may be advantageous to improve model management with a flexible model visualization tool.

A model is a special type of algorithm. An algorithm is a hard-coded set of instructions to calculate a deterministic answer. Models are algorithms whose instructions are induced from a set of data and are then used to make predictions, to make recommendations, or to prescribe one or more actions based on a probabilistic assessment. Models can be utilized to drive business value.

Models can be different from one another in various aspects such that an improved system or method for managing models at different scales taking into account the complexity is desired. Different models may use different techniques or tools, specialized hardware infrastructure (e.g., cloud computing, GPUs), or different development environments. Different models may be built differently. For example, the processes to develop models can be different. In some cases, different models may have different behaviors. Conventional model management may only track and monitor models running in production. The provided model management systems and methods are capable of enabling entities (e.g., companies, organizations, teams, individuals) to reliably and securely develop, validate, deliver and monitor models, thereby improving the development and operational efficiency of the entities.

A model can be an artifact created or trained by applying an algorithm to training data. The model may then be deployed to make predictions against real data. A model may be associated with an experiment and may evolve over time as different data sets are provided to the algorithm and/or parameters are adjusted. There may be one or more models within an experiment. The provided model management system may allow different versions of models to be tracked. In some cases, each of the models may be fully versioned, such that they can reflect changes across time. For example, a model may be specified by a model ID and a version number. A model can be retrieved by the unique model ID and version number. In some cases, every time a model is created or updated, a previous version of the model (if any) may be archived in a registry, and a more recent version of the model may be generated. The versioning may comprise assigning a new unique identifier to the updated model. In addition, the versioning may comprise saving the time point (e.g., date and time of the most recent update).

The model management methods and systems may manage, track and monitor various aspects of data science lifecycles such as the technologies or processes for developing, validating, delivering models. For example, the entire system/platform and knowledge generated throughout the processes of model development and model production may be managed by the model management system. Various aspects of models in different stages of the processes can be visualized via a graphical user interface.

The various aspects managed and monitored by the model managements system may include, but are not limited to, model technologies (e.g., compute infrastructure, software tooling), model development (e.g., data, insights, experiments, processes of building a model, model validation processes), model production (e.g., performance of model, model deployment, integration of model into downstream systems, impact of model products on business, model drifting), model governance (e.g., model dependency graph, model portfolio, status of model), and model context (e.g., knowledge, insights and artifacts generated during building models or using models).

The model management systems and methods include a visual tool for visualizing various aspects of models in a convenient and dynamic manner. A graphical user interface (GUI) can be provided on a display of an electronic device. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The display can be a capacitive or resistive touch display, or a head-mountable display (e.g., Google® Goggles). Such displays can be used with other systems and methods of the disclosure.

In some situations, the GUI may have various graphical, textual, audio and/or video elements. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. The GUIs may be provided in a software, a software application, a web browser, and the like. Links may be generated through an application programming interface (API) which is a set of routines, protocols, and tools for building software applications. A user may interact with the GUI through direct touch on a screen or IO devices such as handheld controller, mouse, joystick, keyboard, trackball, touchpad, button, verbal commands, gesture-recognition, attitude sensor, thermal sensor, touch-capacitive sensors, or any other device. A GUI may enable a user to interact with systems of the disclosure, such as for visualizing statistics about models. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

In some embodiments, the graphical user interface can have a search field or search toolbar that enables a user to input one or more search terms to be used by the system to conduct a search. The search field can include a drop-down menu, pull-down menu or other type of menu to enable a user to select, for example, commonly used words or previous search strings. A graphical user interface can have various other interactive elements such as buttons, text boxes and the like, which may allow a user to provide input commands or contents by directly typing, clicking or dragging such interactive elements. For example, a user may input insights, add definition of rules for alerting an error or model drift, add descriptions, or provide any other type of input via text fields. More examples of the graphical user interface are described later herein.

As utilized herein, terms "component," "system," "interface" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers. Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal). As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

FIG. 1 shows an example of a system 100 for managing models. In some embodiments, the model management system 100 may be a platform comprising multiple components configured for building, validating, delivering, and monitoring models. In the illustrated example, users may access the multiple components via a graphical user interface (GUI). The multiple components may, in some embodiments, include a 'Lab' component 101, a 'Launch pad' component 103, a 'Control Center' component 105 and a 'Knowledge Center' component 107. For example, a 'Lab' component may allow users to develop models, perform exploratory analysis and experimentation, a 'Launch pad' component may allow users to productionize models, a 'Control Center' component may allow users to view various aspects of data science development, production, technology and knowledge across one or more organizations, and a 'Knowledge Center' component may allow users to search and re-use model context from across one or more organizations. In some cases, the multiple components may be self-contained components that can be independently operated and worked on by different users concurrently. Each of the components may be a hardware module, software module, or a combination of hardware and software modules.

Figure 2:
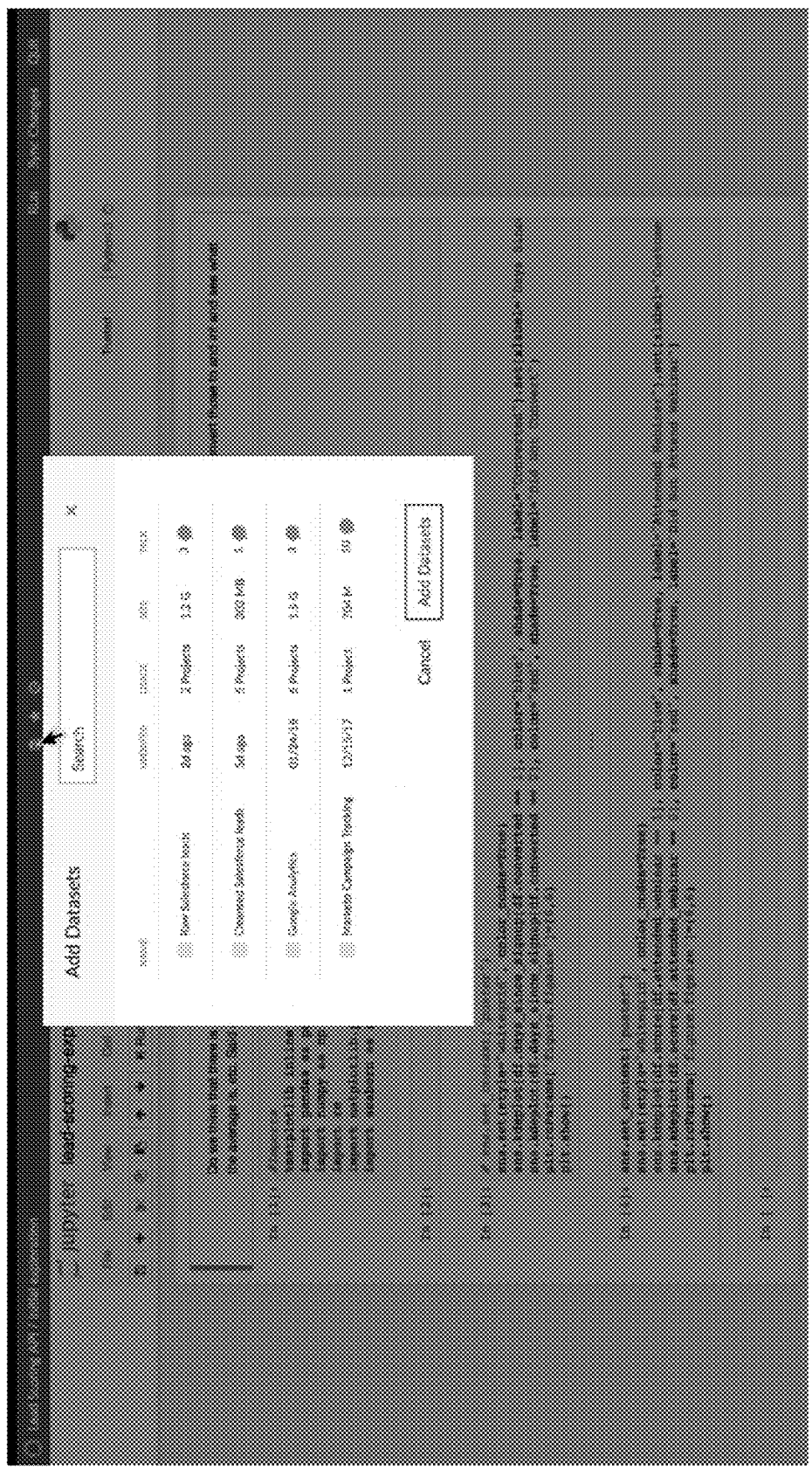
FIG. 2 shows an example of a 'lab' component, in accordance with embodiments of the invention.

FIG. 2 shows an example of a 'Lab' component 200, in accordance with some embodiments of the invention. In some embodiments, the model management system may allow for discovering, sharing, and re-using data sources (e.g., cloud databases, distributed systems), running development and production workloads in fully configurable Docker containers to create shared, re-usable, and revisioned environments, leveraging or dynamically allocate scalable compute to vertically and horizontally scale resources (e.g., in the cloud, on-premise) or accessing hardware such as GPU with easy operation (e.g., one-click).

A Docker container is a running instantiation of an image, essentially a working version of an image. In an example, a user may create or deploy a new container or application using a Docker. In some cases, to deploy a simple application using Docker, a user may create a directory and, inside the directory, create a Dockerfile. In the Dockerfile, the user may describe what they want to include in the container that they would like to run. The user may then run a "docker-build" command, which will examine the directory specified and the Dockerfile contained therein and build a Docker image. The user may then run a "docker run" command, which will create a Docker container that can run anything that has been specified in the Dockerfile. The aforementioned Docker images are essentially blueprints and can be considered as models that describe what a Docker container should look like, at least when the container is first started.

As shown in FIG. 2, through the 'Lab' component, users may add or re-use data sources such as cloud databases, distributed systems (e.g., Hadoop, Spark) via the provided platform. The 'Lab' component may also allow users to launch or create an interactive workspace. For example, a user may launch a new workspace by selecting a tool, hardware, environment and other configurations via the 'lab' interface. A workspace may be created using any suitable tools such as Jupyter, RStudio, SAS, H2O, Zeppelin and various others. Such tools may or may not be web-based. In the illustrated example, a user may select one or more datasets, search a dataset or add a dataset via the graphical user interface provided by the 'Lab' component.

The 'Lab' component may also be configured to automatically preserve an experiment's context. For example, each time an experiment is run, the model management system may capture the full set of model dependencies (data, code, packages/tools, parameters, and/or results) and the discussion of the experiment's results. The discussion may be entered by users via the graphical user interface. A discussion is to interpret and describe the significance of findings in light of what was already known about a research problem being investigated and to explain any new understanding or insights that emerged as a result of the experiment or research. A discussion may include information that presents the underlying meaning of the experiment result, note possible implications in other areas of study, and explore possible improvements that can be made in order to further develop the concerns of the research. In some cases, the discussion may be referenced or linked to an execution of codes in a container. The provided model management system may be capable of capturing, archiving, or storing complex states of hierarchy of library and data dependencies. Typically, data science tasks comprise obtaining data from a raw state. Such data may be structured in a format (e.g., stored in a data structure) which is optimized for the system that created it. Next, the data is processed (e.g., by massaging, cleaning, aggregation, transformation, feature extraction, or a combination thereof) to allow for further analysis (e.g., analytical processes) to discern or determine one or more outputs, such as an underlying structure or a prediction of behaviors. Any or all of these different data processing or data analysis steps can be dependent on a hierarchy of libraries and data dependencies. For example, if a model is generated by an algorithm using a dozen different input data sets, a dozen data dependencies are created (one for each link between an input data set and an output model). The input data sets may themselves be dependent upon the outputs of one or more algorithms, creating a depth of hierarchy of libraries and data dependencies. Such hierarchy can be significant, often dozens of layers deep for complex models.

Figure 3:
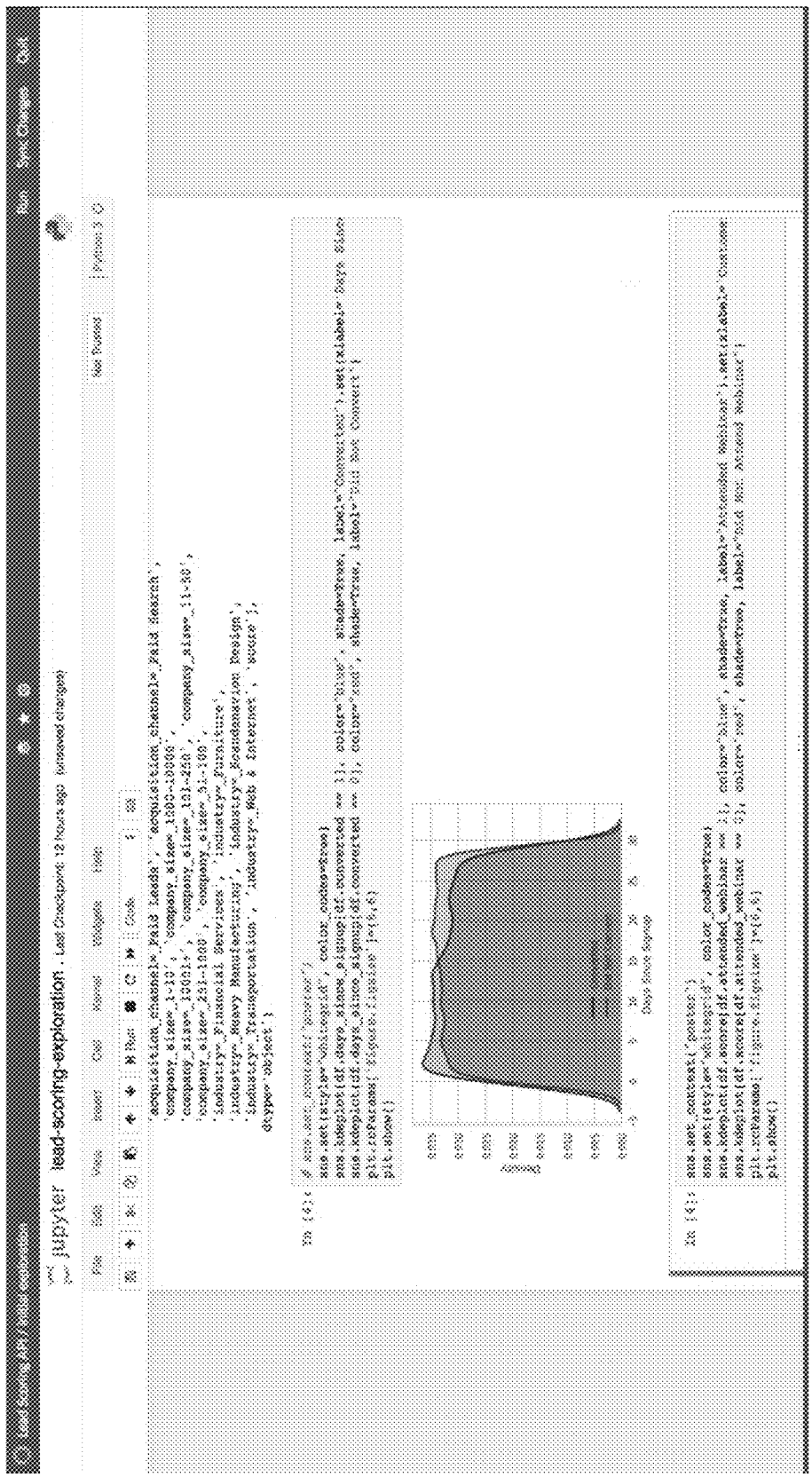
FIG. 3 shows another example of a 'lab' component, in accordance with embodiments of the invention.

FIG. 3 shows another example of the 'Lab' component 300. In the illustrated example, upon launching the workspace, the 'Lab' component may spin up the environment and allow a user to build the model via an interactive notebook (e.g., Jupyter, Python, R, Julia, RStudio, PySpark, Xeppelin, H2O Flow, etc). For instance, the runtime result of an experiment may be dynamically displayed. A user may be permitted to select the result (e.g., graph) and/or create an 'insight' via the graphical user interface. Such results, experimental parameters or insights may show up on an activity feed and searchable by others in the organization. This allows the organizations knowledge base to be increased and easily accessible by users.

Figure 4:
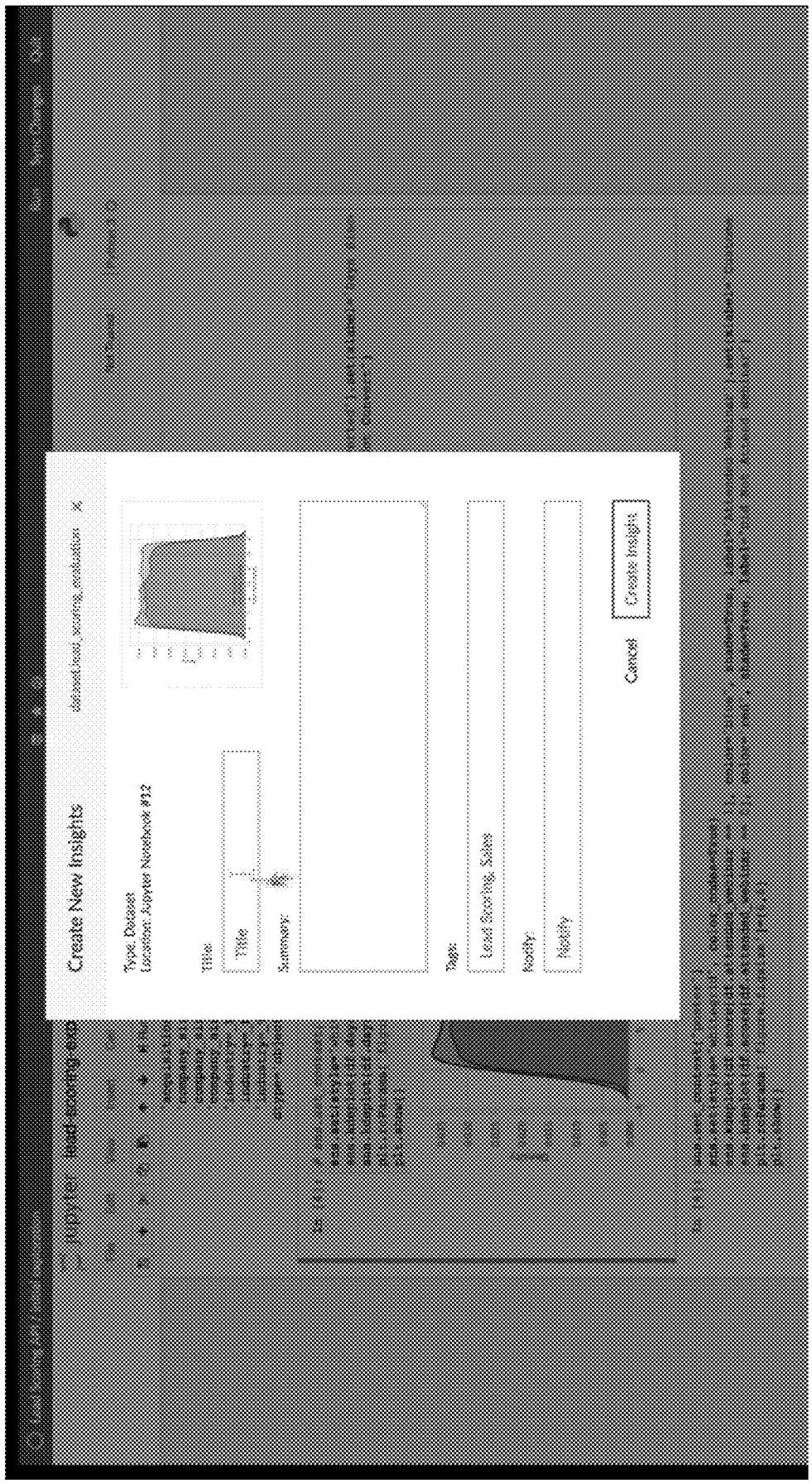
FIG. 4 and FIG. 5 show examples of creating insights via a graphical user interface (GUI) of a model management system.
Figure 5:
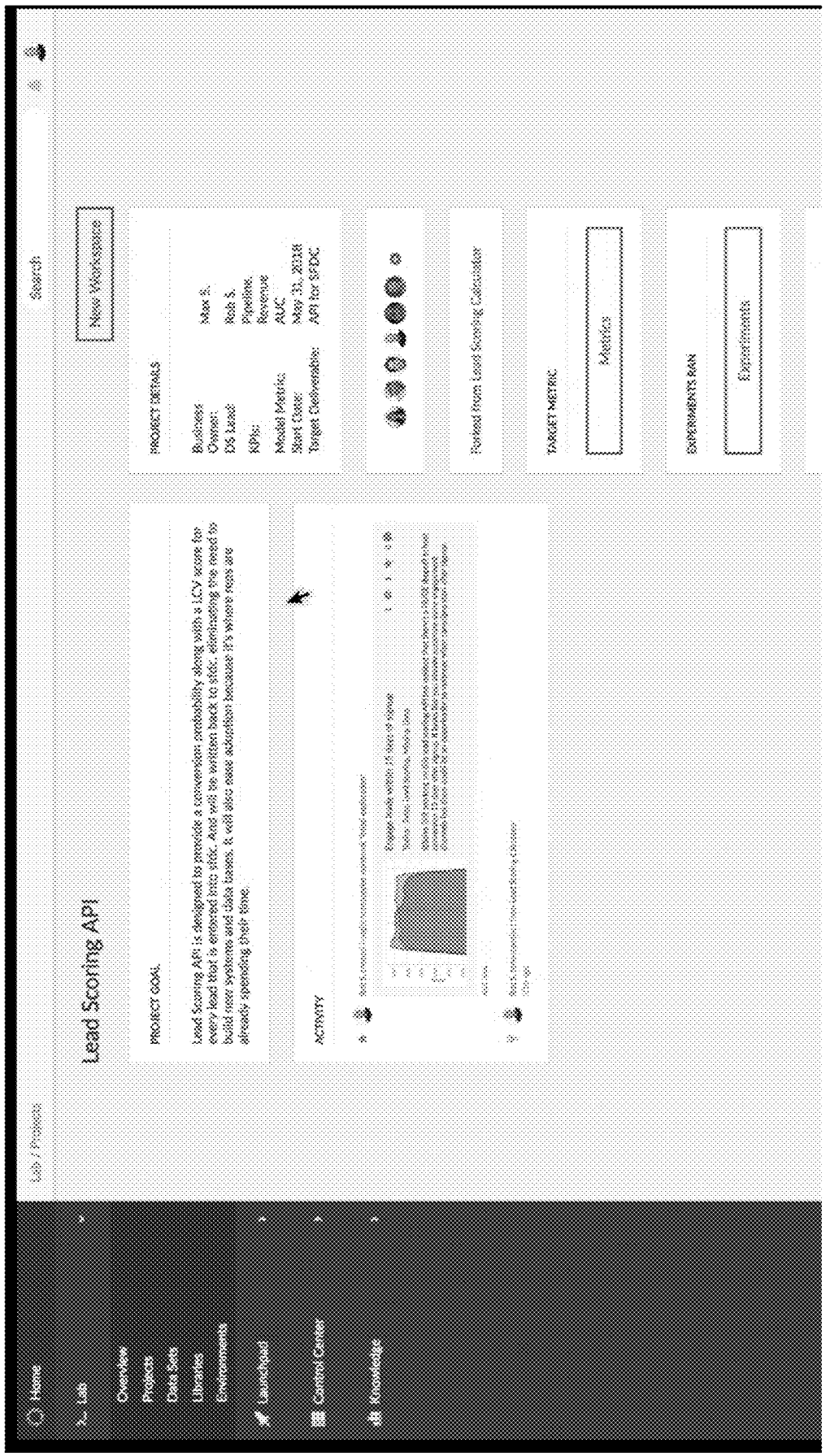

FIG. 4 and FIG. 5 show examples of creating insights via a graphical user interface (GUI) of a model management system. In some embodiments, a user may create an insight on a result, a parameter, a process or any other steps or components during model development via the 'Lab' component. An insight can be description that a user entered with respect to a result, a parameter, a process or any other steps or components during model development. When creating the insight, contextual information about the insight may be included. For example, title, summary, tags, and/or notification information may be added. In some cases, the created insight may be automatically added to an activity history of the user such as the activity panel as shown in FIG. 5. Alternatively or in addition to, the created insight may be added to a knowledge database that may not be shared with other users. In alternative cases, the knowledge base may be shared by other users and may be searchable by the user and/or other users. In some cases, a GUI for creating insights may include a pop-up field or a dynamic overlay field over a 'Lab' component or other portion of a workspace.

The model management system allows users to easily put a model into production via a graphical user interface. A user may select from multiple forms (e.g., API REST, App, report, Web form) the model to be productionized. In an example, when a user selects an API, the user may further specify configurations of the API such as the infrastructure the API is running off (e.g., hardware, region, cluster, number of replicas, etc) and various other configurations.

Figure 6:
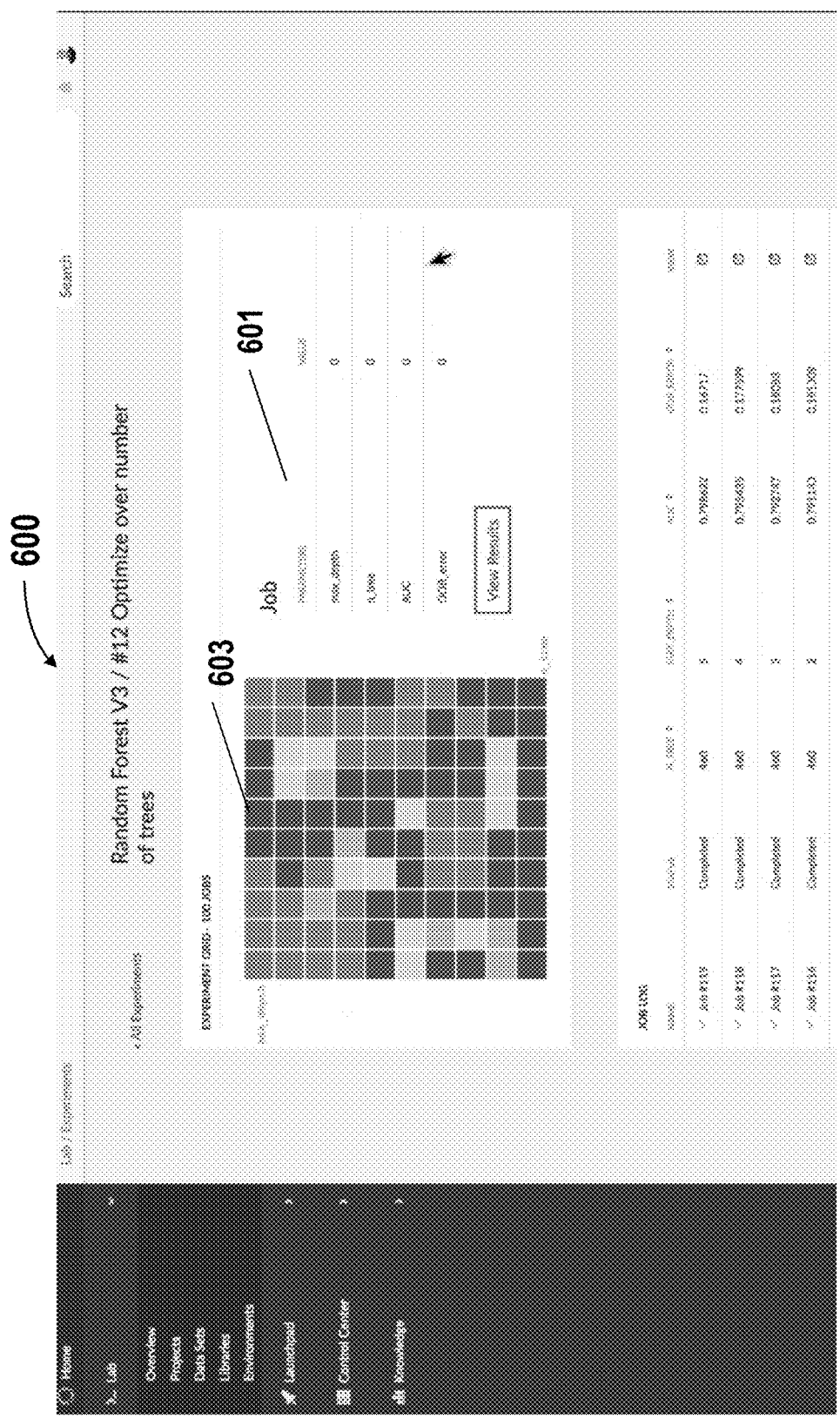
FIG. 6 shows an example of a 'lab' component, in accordance with embodiments of the invention.

The model management system may provide an aggregated result of experiments/projects with flexibility for a user to configure one or more hyper parameters. This provides advantages for teams or groups of users to try a large scale of experiments in parallel to search and prune large problem spaces with ease to find the optimal model. FIG. 6 shows an example of displaying results of parallel experiments 600. A user may configure one or more hyper parameters 601 (e.g., max_depth, n_tree, AUC, OOB-error) via the graphical user interface. A large scale of parallel experiments may be displayed with respect to user selected hyper parameters. These parallel experiments can be demonstrated in a two-dimensional gradient chart 603 or any other suitable plots allowing users to visualize a large scale experiments with respect to selected dimensions (i.e., hyper parameters) in a compact and straightforward manner.

Figure 7:
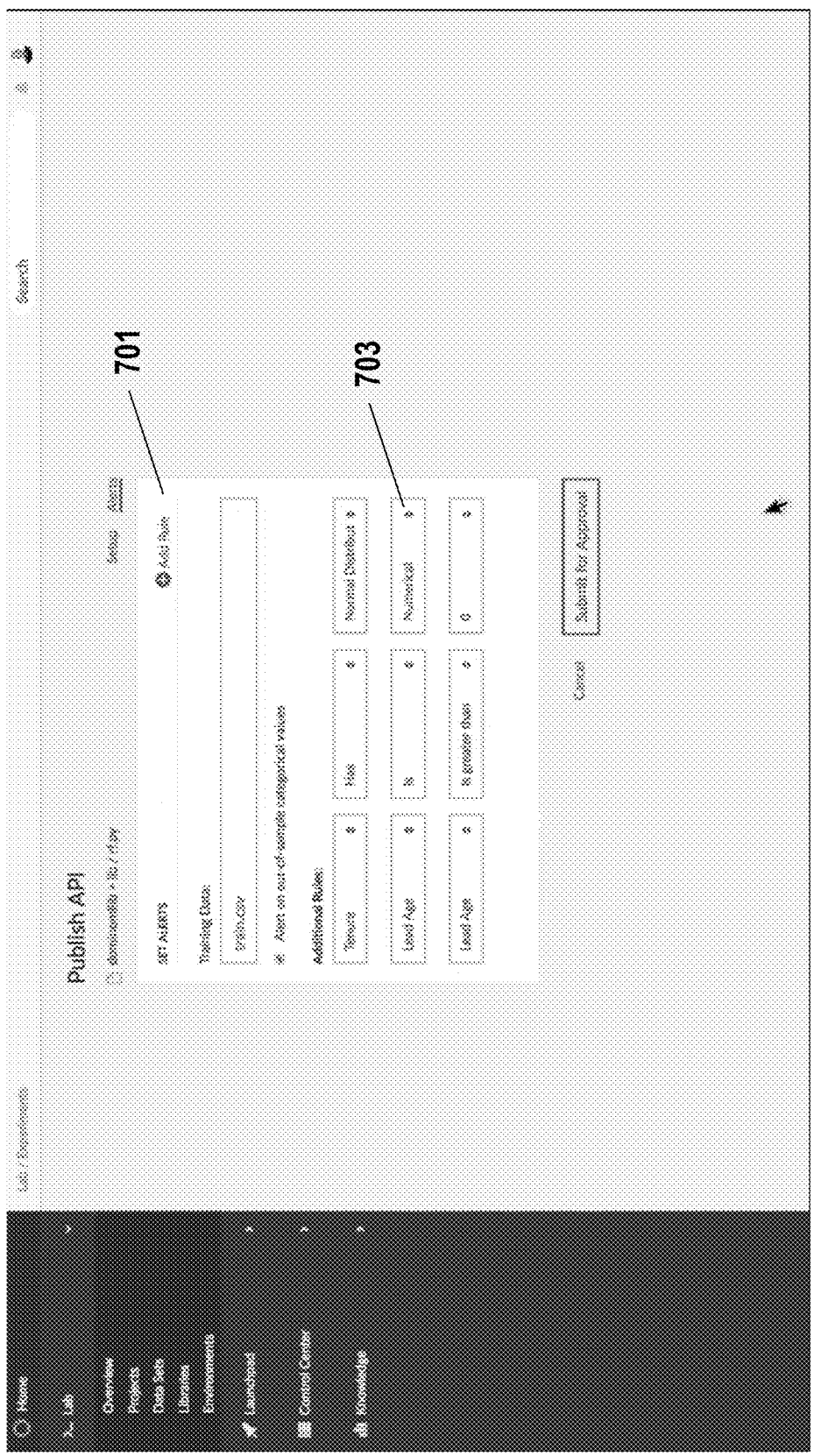
FIG. 7 shows an example of model drift monitored by the model management system.

The model management system may be capable of detecting model drift. In some cases, a user may set an alert for alerting a model drift. FIG. 7 shows an example of monitoring model drift. For example, a user may set up rules for alerting a model drift. For example, a user may create workflow rules by setting up threshold and alerts. A user may set up rules by adding/deleting rules 701, changing parameters of rules 703 (e.g., threshold) or any other actions. The alert may be delivered in any suitable forms (e.g., audio, visual alert in a GUI, etc) or via any suitable communication channels (e.g., email, Slack, MSN).

In some cases, the model management system may allow users to monitor models via a GUI. The model management system may be configured to register a model with a model monitoring system, associate that model with a particular training dataset, automatically map the underlying features, and then register ongoing inferences by the model against the training dataset to understand deviations from the training data set. Such model drift detection may be performed regardless of statistical programming language (e.g., R, Python, etc.) and model types (e.g., classification, regression, clustering). In another example, a user may create a probability of default model for residential mortgages in Florida and the model management system may generate an alert if a new consumer is using the model to predict PD of commercial mortgages in Texas. The model management system may be coupled to or comprise a model monitoring system.

Figure 8:
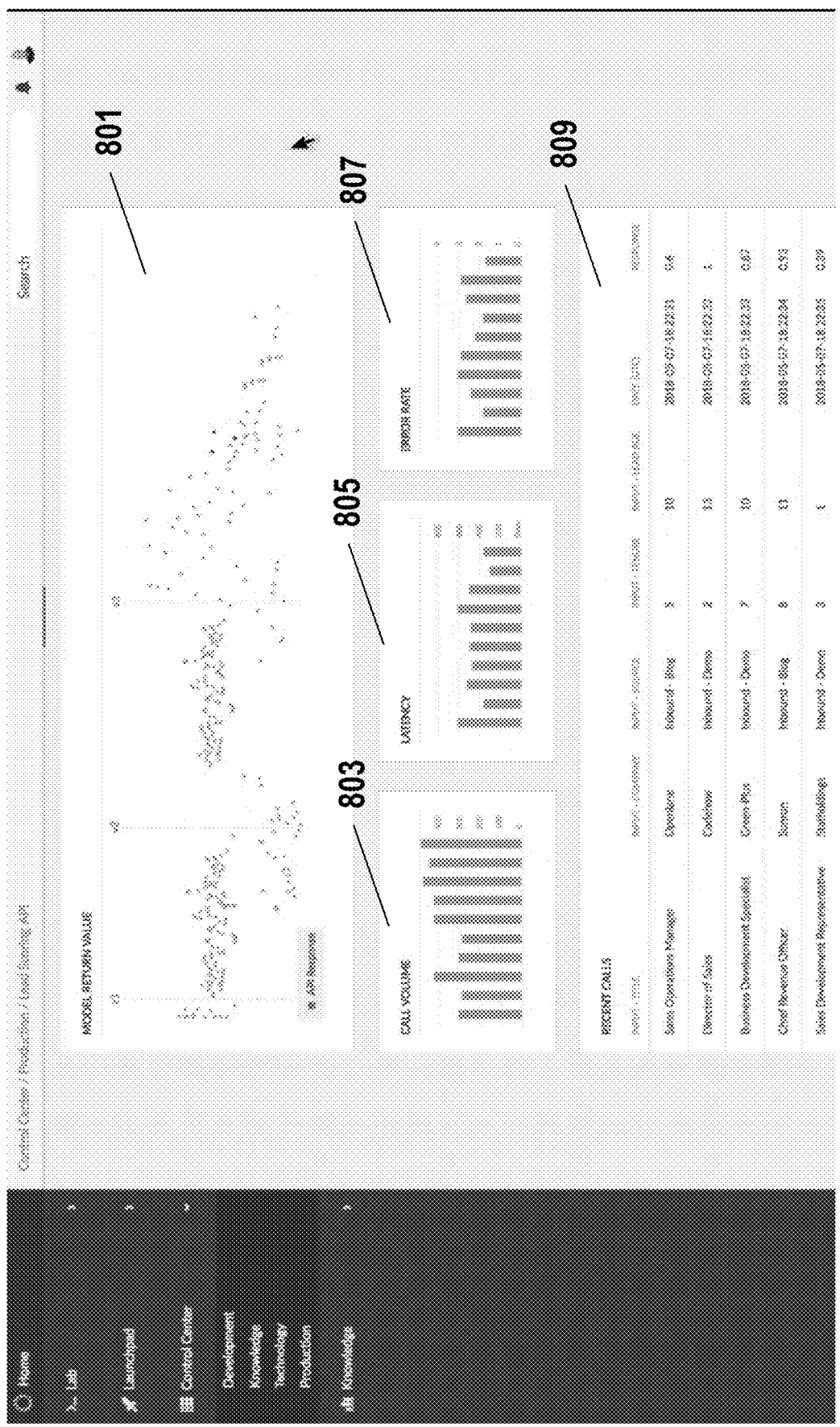
FIG. 8 shows an example of detected model drift.
Figure 9:
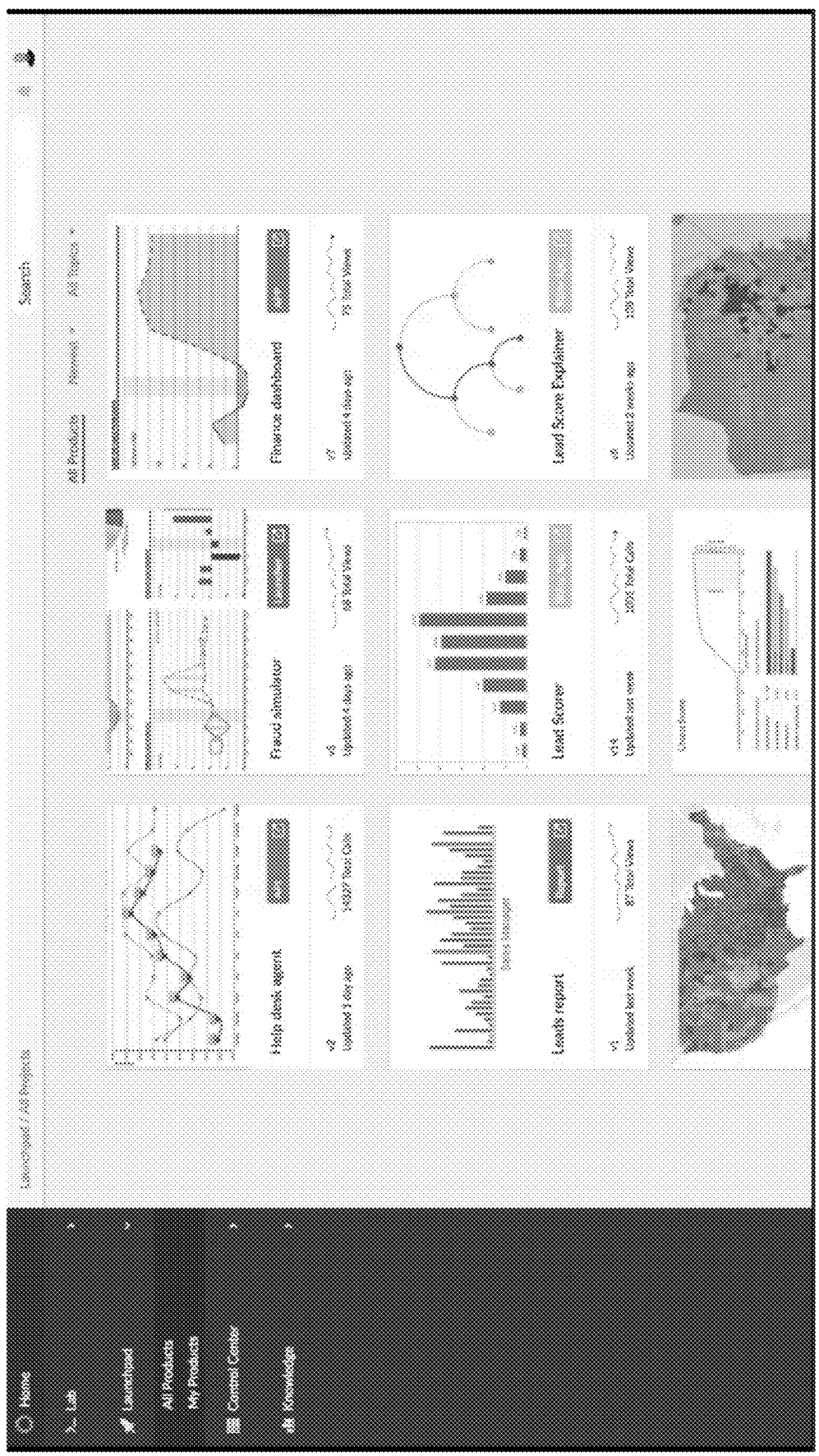
FIG. 9 shows an example of 'launch pad' for managing model products.

In some cases, a production model may drift and the production model may need to be re-validated and deployed again to re-train. With the model management system, models drifting can be detected instantly. In some cases, upon detection of a model drift, a user may retrain and deploy new versions, or shut down and revert to a prior version to mitigate risk. The result of model drift may be accessed or visualized via the 'Control Center' component. FIG. 8 shows an example of detected model drift. Various aspects of a model may be monitored and displayed on the graphical user interface. For example, a model return value 801, call volume 803, latency 805, error rate 807 and others can be displayed to users via suitable format (e.g., scatter plot, bar graph, etc). In addition to, a log of the models 809 may also be included in the graphical user interface allowing users to view or sort the models with respect to selected parameters (e.g., title, company, source, time, response, etc).

Figure 10:
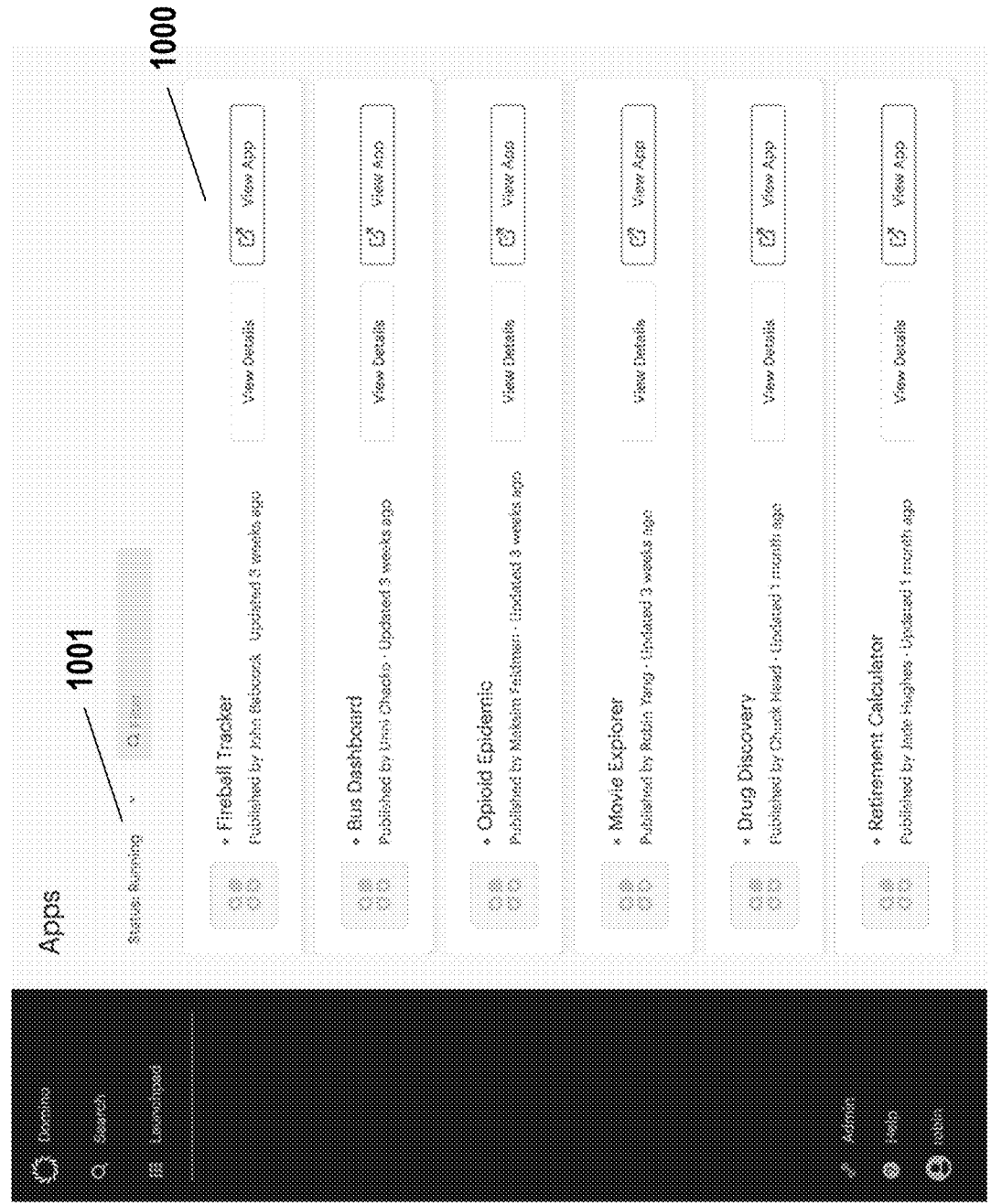
FIG. 10 shows an example of a catalog view of applications provided by a 'launch pad' component.
Figure 11:
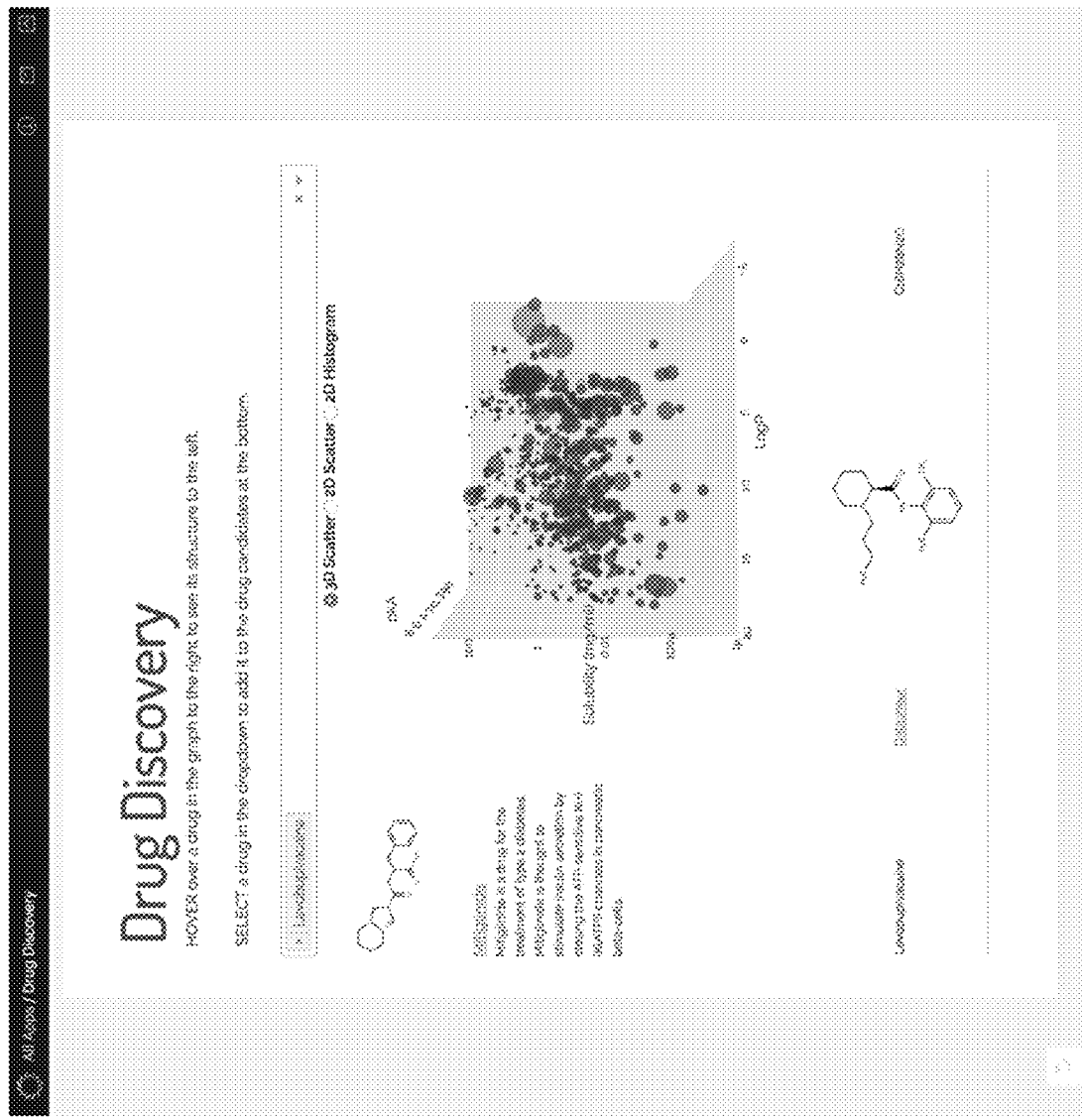
FIG. 11 shows an example of a web application developed by a 'launch pad' component.

FIGS. 9-12 show examples of a 'Launch Pad' component for managing model products. The 'Launch Pad' component may be configured to catalog model-backed products, record and visualize the consumption patterns of individual model products, and an aggregate behavior of a model. The 'Launch Pad' component may deliver production-grade model products (e.g., reports, Flask/Shiny apps, and APIs) to drive business impact. For example, the "Launch Pad" component may be capable of delivering model products to business stakeholders as scheduled reports, Flask and Shiny apps, or user-friendly web forms, delivering models as enterprise-grade batch or real-time APIs for integration into downstream systems, tracking engagement and key statistics of models over time to understand usage and performance of the models, or automatically preserving link from delivered model product to original development project for rapid iteration. FIG. 10 shows an example of a catalog view of applications 1000. As shown in the example, product applications can be viewed and accessed by their status (e.g., "Running") 1001. The graphical user interface may allow users to filter the applications 100 by status 1001 or other user preferred search terms. FIG. 11 shows an example of a web application. The 'Launch Pad' may also allow a user to see entities that are engaging with a given model product and the associated activities so as to determine model impact.

Figure 12:
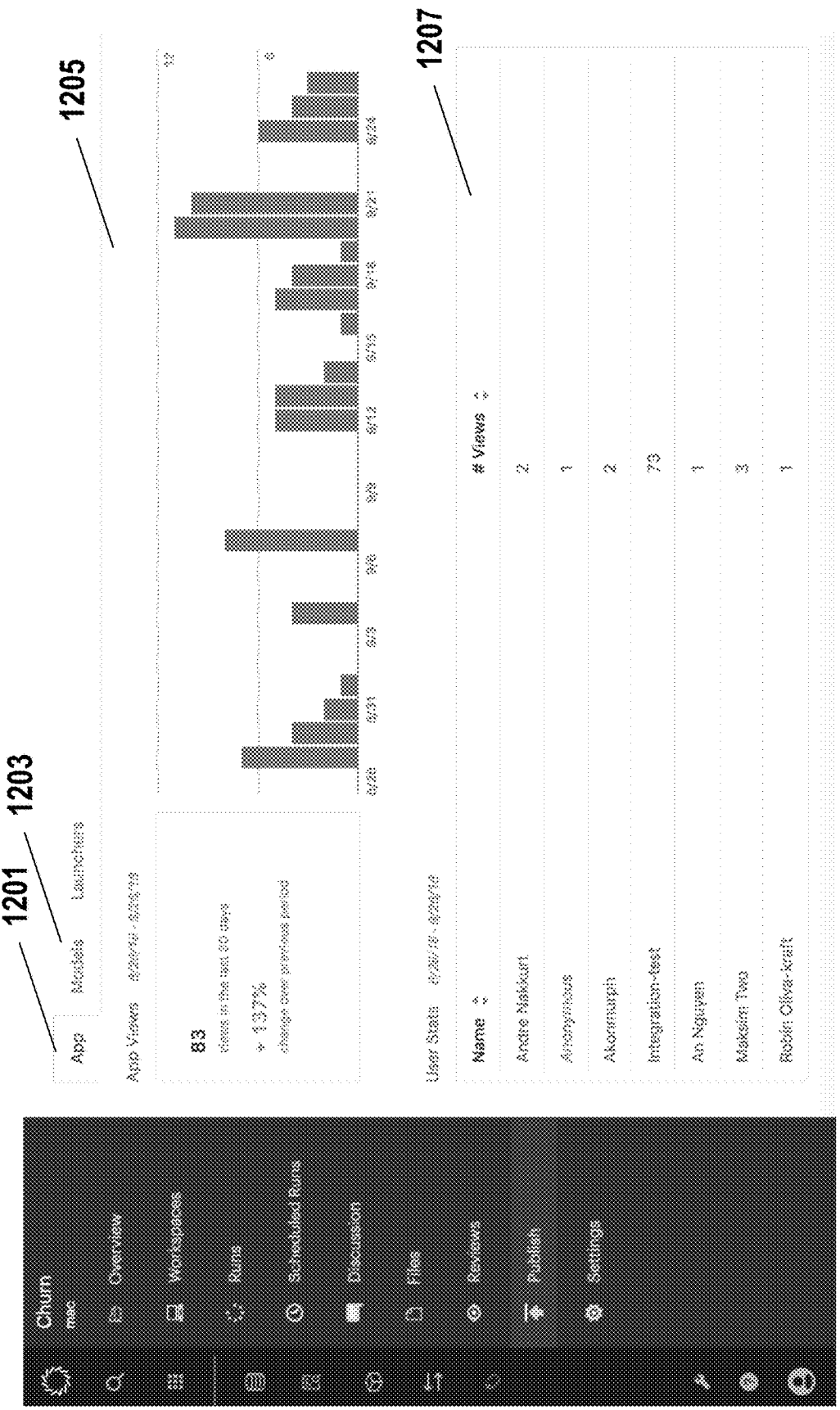
FIG. 12 shows an example of statistics (e.g., usage) of an application tracked by a launch pad' component.

In some embodiments, the 'Launch Pad' component may provide usage tracking of products, such as applications. For example, usage of web applications built using tools such as Shiny, Flask, or Dash may be tracked. The "Launch Pad' component may show users the major consumers of selected 'model products' built by the data scientists. This tracking function may be enabled by fully controlling the hosting and permissioning schemes of the applications as described later herein. FIG. 12 shows an example of statistics (e.g., usage) of an application. As shown in the example, statistics of users who use the application may be tracked and analyzed. The statistics can be displayed in any suitable formats such as bar plots, diagrams, pie charts, tables, histograms and the like. A user may customize the histogram via the graphical user interface such as by changing the period of time or other filtering terms or appearance parameters (e.g., size of the plot, color, or type of plot). In the illustrated example, statistics about the app viewed over a period of time may be displayed in a histogram 1205. Additionally, a log view 1207 of people who viewed the app (e.g., user stats) may also be displayed. The log view 1207 may allow a user to sort the user statistics by variables such as name or number of views.

In some embodiments, the 'Launch Pad' may provide full traceback to a parent project or parent model. The model management system may be able to link a product to a parent project by tracing the environments (e.g., storing the full history of data, code, compute environment, experiments, etc.). The 'Launch Pad' component may configure the graphical user interface to provide statistics about an execution of a selected model (e.g., application, API, reports, etc) and a linkage between the execution of the selected model and a selected version of the model developed within the model management platform. As shown in FIG. 12, a user may switch between the App 1201 and Models 1203. The computing environments may be automatically tracked and recorded by the system. The provided model management system may allow for reconstructing an environment that accurately reflects the environment captured at a given time point. In some embodiments, the model management system may include an automated computing environment management system that is configured to build environments, build catalogs the environments, and create linkages between the environments and/or components of the environments in a fully automated fashion. Such an automated computing environment management system may include those described in U.S. application Ser. No. 16/194,204 entitled "Systems And Methods For Automated Computing Environment Management", which is incorporated by reference herein in its entirety.

Figure 13:
FIGS. 13-17 show examples of 'control center' in accordance with embodiments of the invention.

FIGS. 13-17 show examples of a 'Control Center' component in accordance with embodiments of the invention. The 'Control Center' component may allow for viewing various aspects model development, production, technology and knowledge across one or more organizations so as to manage models at a system-level. For example, as shown in FIG. 13, the 'Control Center' component may render a GUI allowing users to review the status of projects (e.g., in-flight projects, recent progress), and insights. For example, summary information such as reused components, revisions per month, and/or insights created 1301 may be displayed. In some cases, statistics about the reused components may be presented in a component reuse graph 1303. A user may also be permitted to, via one or more log views 1305, search, filter or sort the reuse statistics by the type of component (e.g., datasets, code libraries, environment), name, number of reused times, owner or other parameters.

The 'Control Center' may be configured to generate and display a model dependency graph to show components of a system. For example, the 'Control Center' may be configured for mapping linkages across key components (e.g., datasets, environments, code samples, etc.) within a system to build machine learning models. The model dependency graph may show how these various key components are mapped to each other across models. For example, in a model dependency graph, models may be represented as nodes and data are represented as the arcs. The combination of information may be useful for determining potential impact of various components. For example, if a component is reused many times, improvement or variation in the component can have far-reaching effects. A graphical display of the model dependency may assist a user in determining what the impact may be of changing a particular component. In some cases, the model dependency graph may be displayed dynamically and automatically. For instance, the model dependency graph may be updated and refreshed automatically upon detecting a change in the components (e.g. models, data, etc). Alternatively or in addition to, the model dependency graph may be refreshed in response to receiving a user command.

Figure 14:
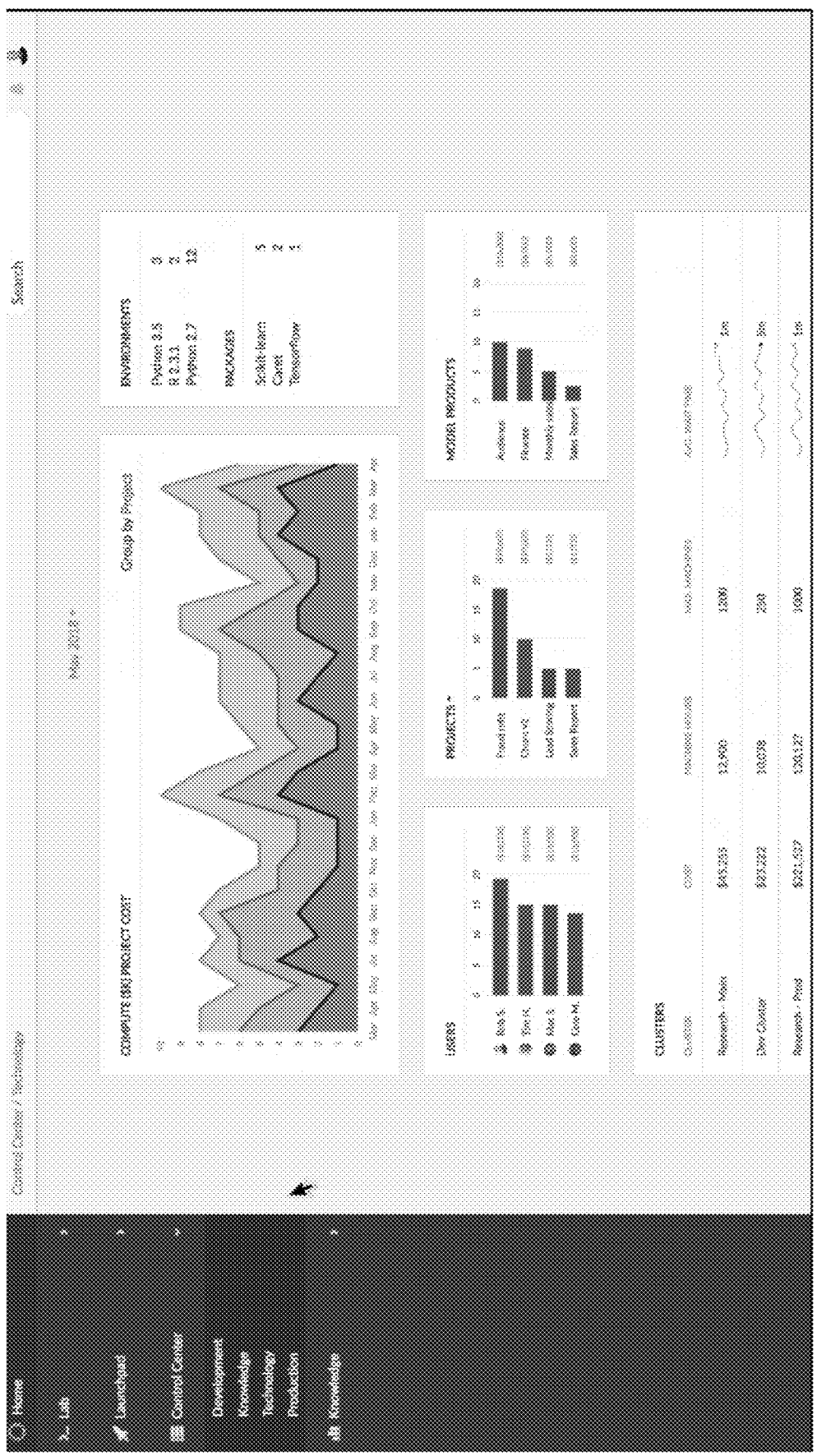

The 'Control Center' may also be configured to track hardware usage and expenditure across both cloud and on-premise platforms for machine learning model development and delivery. As shown in FIG. 14, usage and costs of hardware resources for model development and deployment in the cloud, on-premise, or in a hybrid deployment are tracked. By tracking the hardware usage and cost, users may be able to drill down to understand usage by a project, a user, and/or a hardware type over time. Display of hardware usage and expenditure information may be broken down as shown in the example and may aid in analyzing the usage statistics.

Figure 15:

FIG. 15 shows an example of a production section of a 'Control Center' component. This feature allows a user to visualize how the models in an organization are being used or consumed. Information, such as the number of projects completed, in-flight projects, and/or average project duration may be displayed. Information on individual projects may be displayed in a list or table with additional details.

Figure 16:
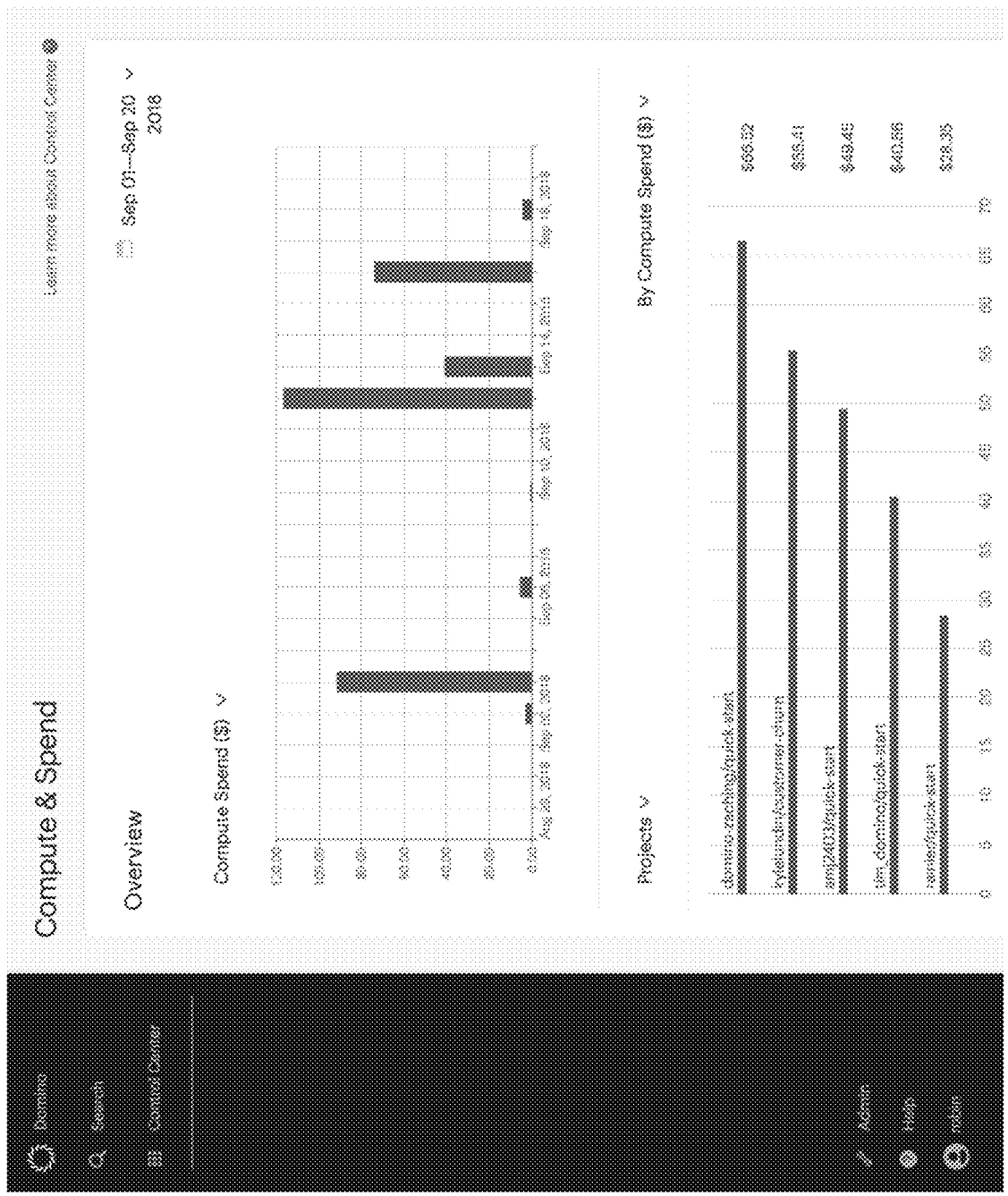
Figure 17:
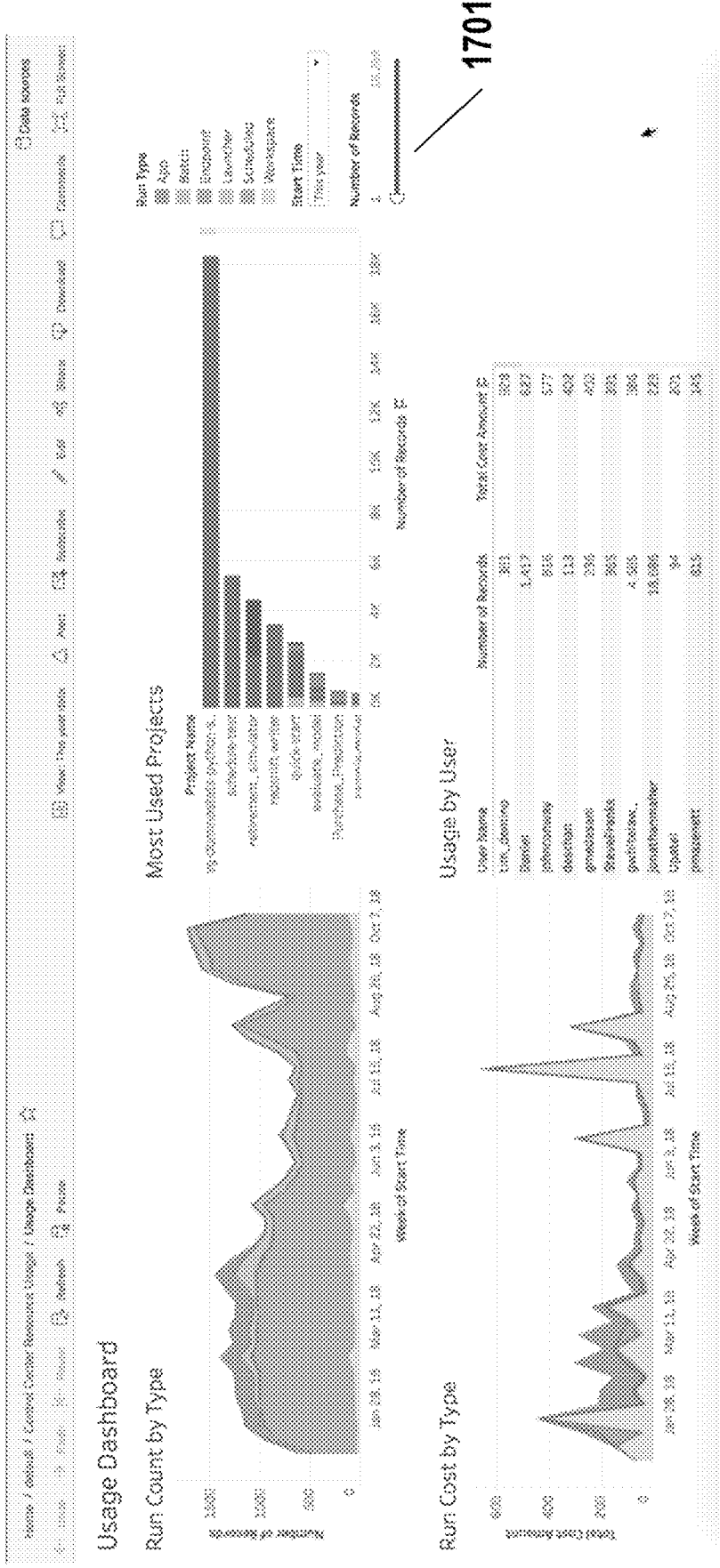

The 'Control Center' component may provide information, analyses or statics about models at different levels. For example, the "Control Center' component may provide platform level information such as platform-wide resource usage patterns or statistics. For instance, all the work or projects managed by the model management system may be tracked and usage reports such as the cost and time may be generated by project, user, or type of hardware. FIG. 16 shows an example of platform level resource patterns. In another example, the 'Control Center' component may provide information according to user preferences. In some cases, users may be allowed to customize usage reports. For instance, the 'Control Center' component may provide API extensibility allowing users to build customized reports and analyses of the usage data. FIG. 17 shows an example of a dashboard allowing users to drill down to explore user preferred information. As illustrated in FIG. 17, a user may be permitted to edit the usage dashboard. A user may modify a display arrangement or change the appearance of the usage statistics. A user may provide inputs via interactive elements on the graphical user interface for editing one or more rules for reviewing a report, generating a report or displaying a report. For example, a user may choose which charts to show/hide or define parameters of a chart (e.g., "number of records", "start time"). In another example, a user may adjust the filtering terms (e.g., number of records) by manipulating a sliding bar 1701.

It should be noted that application of the provided methods and systems are not limited by the underlying computing infrastructure or computing environment. For instance, the provided model management system model monitoring system may be applied to grid computing platform or systems utilizing various technologies such as mesh computing, peer-to-peer computing, autonomic (self-healing) computing, wireless sensor networks, mobile data acquisition, mobile signature analysis, cooperative distributed peer-to-peer ad hoc networking and processing, local cloud/fog computing and grid/mesh computing, dew computing, mobile edge computing, cloudlet, distributed data storage and retrieval, remote cloud services, augmented reality and the like. It is understood in advance that although this specification includes description of cloud computing, implementation of the teachings recited herein are not limited to a cloud computing environment. Rather, embodiments of the present invention are capable of being implemented in conjunction with any other types of computing environment now known or later developed.

Figure 18:
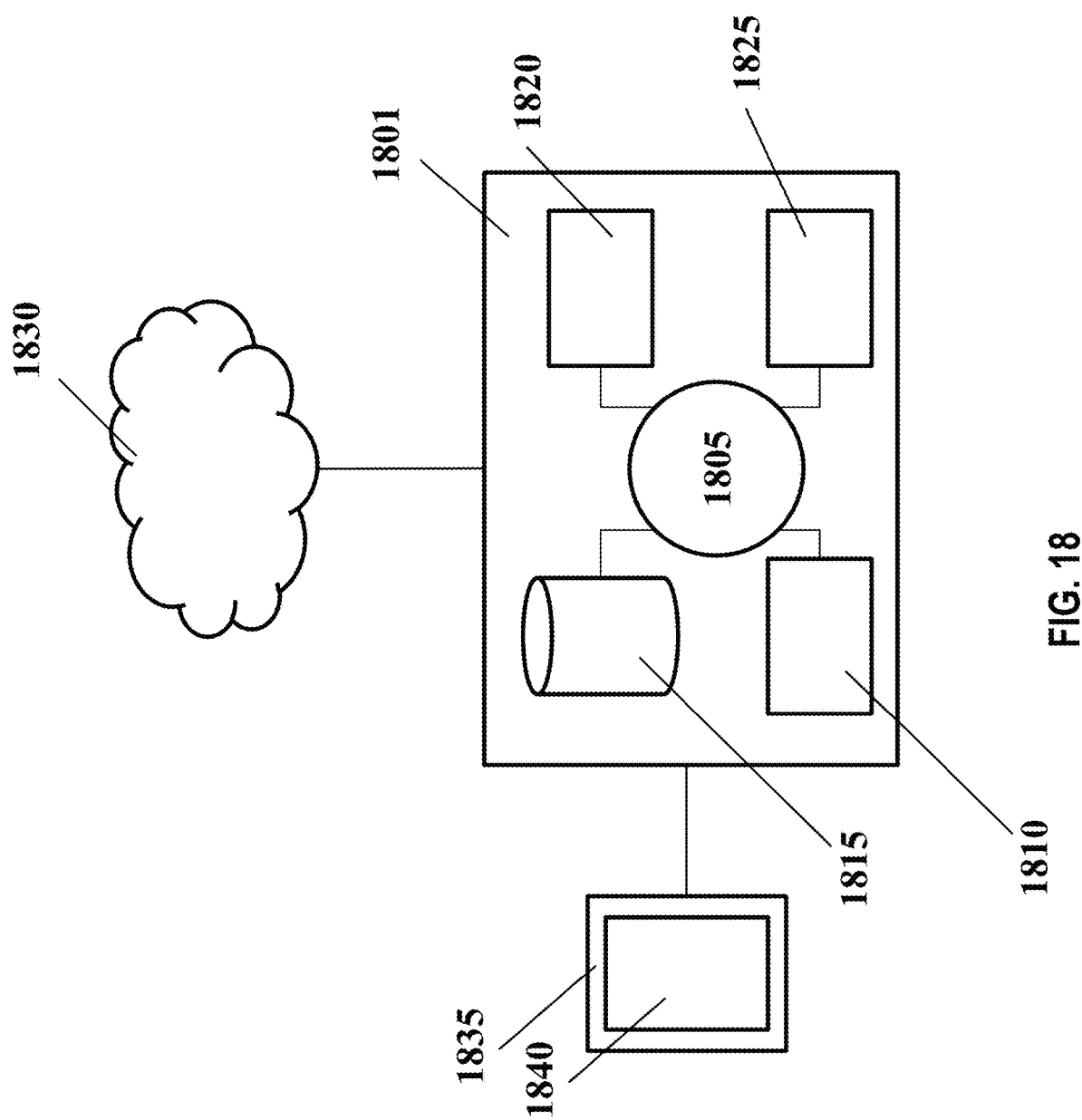
FIG. 18 shows a computer system that is programmed or otherwise configured to implement a model management system as described above.

The present disclosure provides computer systems that are programmed to implement methods and systems of the disclosure. FIG. 18 shows a computer system 1801 that is programmed or otherwise configured to implement a model management system as described above. The computer system 1801 can regulate various aspects of the present disclosure, such as, for example, implementing various components of the model management system, rendering graphical user interfaces and the other functions as described elsewhere herein. The computer system 1801 can be an electronic device of a user or a computer system that is remotely located with respect to the electronic device. The electronic device can be a mobile electronic device.

The computer system 1801 includes a central processing unit (CPU, also "processor" and "computer processor" herein) 1805, which can be a single core or multi core processor, or a plurality of processors for parallel processing. The computer system 1801 also includes memory or memory location 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The computer system 1801 can be operatively coupled to a computer network ("network") 1830 with the aid of the communication interface 1820. The network 1830 can be the Internet, an internet and/or extranet, or an intranet and/or extranet that is in communication with the Internet.

The network 1830 in some cases is a telecommunication and/or data network. The network 1830 can include one or more computer servers, which can enable distributed computing, such as cloud computing. For example, one or more computer servers may enable cloud computing over the network 1830 ("the cloud") to perform various aspects of analysis, calculation, and generation of the present disclosure, such as, for example, capturing a configuration of one or more experimental environments; performing usage analyses of products (e.g., applications); and providing outputs of statistics of projects. Such cloud computing may be provided by cloud computing platforms such as, for example, Amazon Web Services (AWS), Microsoft Azure, Google Cloud Platform, and IBM cloud. The network 1830, in some cases with the aid of the computer system 1801, can implement a peer-to-peer network, which may enable devices coupled to the computer system 1801 to behave as a client or a server.

The CPU 1805 can execute a sequence of machine-readable instructions, which can be embodied in a program or software. The instructions may be stored in a memory location, such as the memory 1810. The instructions can be directed to the CPU 1805, which can subsequently program or otherwise configure the CPU 1805 to implement methods of the present disclosure. Examples of operations performed by the CPU 1805 can include fetch, decode, execute, and writeback.

The CPU 1805 can be part of a circuit, such as an integrated circuit. One or more other components of the system 1801 can be included in the circuit. In some cases, the circuit is an application specific integrated circuit (ASIC).

The storage unit 1815 can store files, such as drivers, libraries and saved programs. The storage unit 1815 can store user data, e.g., user preferences and user programs. The computer system 1801 in some cases can include one or more additional data storage units that are external to the computer system 1801, such as located on a remote server that is in communication with the computer system 1801 through an intranet or the Internet.

The computer system 1801 can communicate with one or more remote computer systems through the network 1830. For instance, the computer system 1801 can communicate with a remote computer system of a user (e.g., a user of an experimental environment). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1801 via the network 1830.

Methods as described herein can be implemented by way of machine (e.g., computer processor) executable code stored on an electronic storage location of the computer system 1801, such as, for example, on the memory 1810 or electronic storage unit 1815. The machine executable or machine readable code can be provided in the form of software. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1801 can include or be in communication with an electronic display 1835 that comprises a user interface (UI) 1840 for providing, for example, the various components (e.g., lab, launch pad, control center, knowledge center, etc) of the model management system. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1805. The algorithm can, for example, capture a configuration of one or more experimental environments; generate user defined reports of hardware usage; monitor models; and generate usage statistics of selected projects or models.

In some embodiments, the model monitoring system may be configured to detect a drift of model performance and/or drift of model data. The model monitoring system can be a standalone system or can be coupled to any other systems or subsystems. In some cases, the model monitoring system may be a self-contained component that can be independently operated and worked on by different users concurrently. In some cases, the model monitoring system may be implemented as part of a model management system or be integrated with the model manage system as a single component. In some cases, the model management system may be configured to register a model with the model monitoring system, associate that model with a particular training dataset, automatically map the underlying features, and then register ongoing inferences by the model against the training dataset to understand deviations from the training data set. Such model drift detection may be performed regardless of statistical programming language (e.g., R, Python, etc.) and model types (e.g., classification, regression, clustering).

Figure 19:
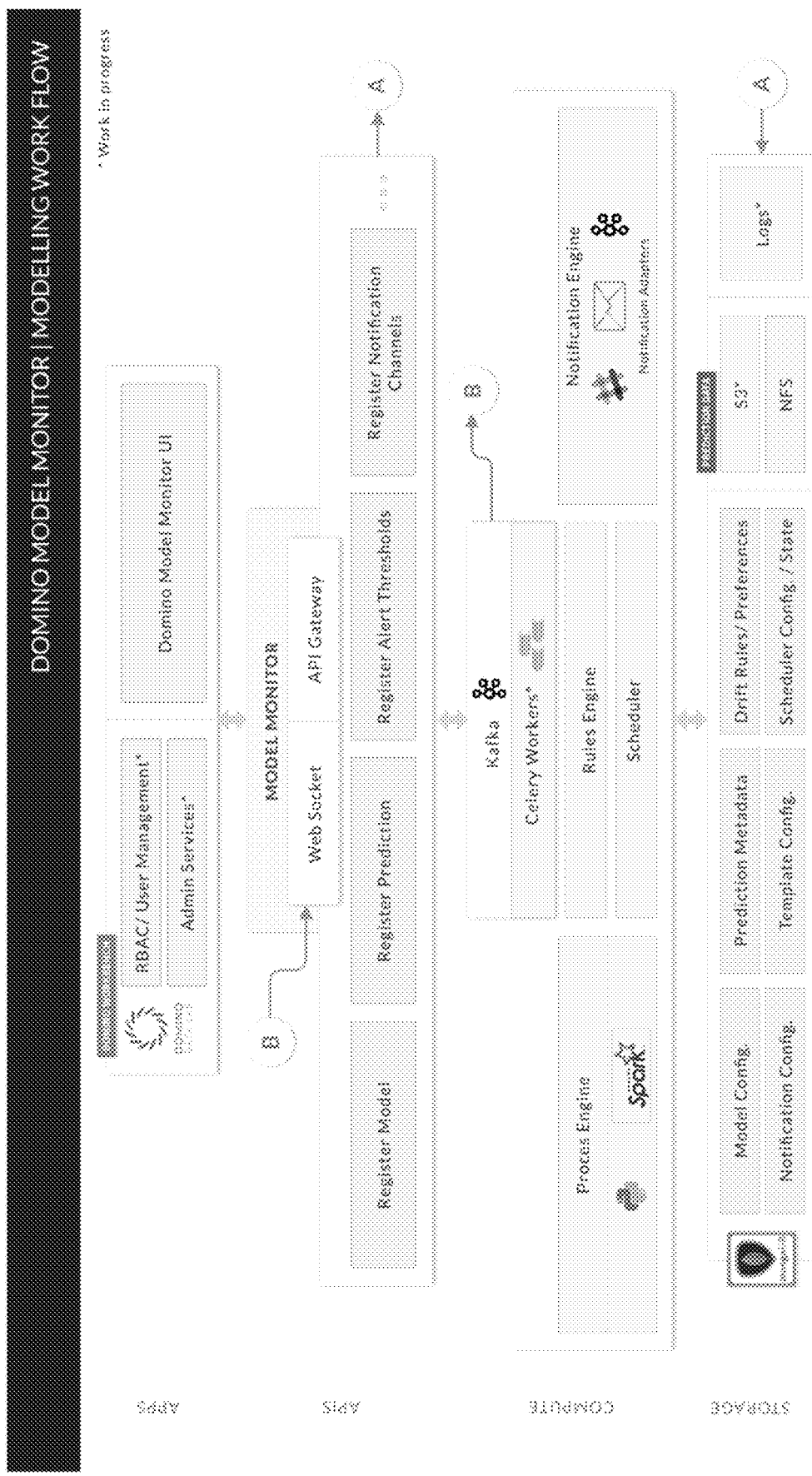
FIG. 19 schematically shows architecture of a model monitoring system, in accordance with embodiments of the invention
Figure 20:
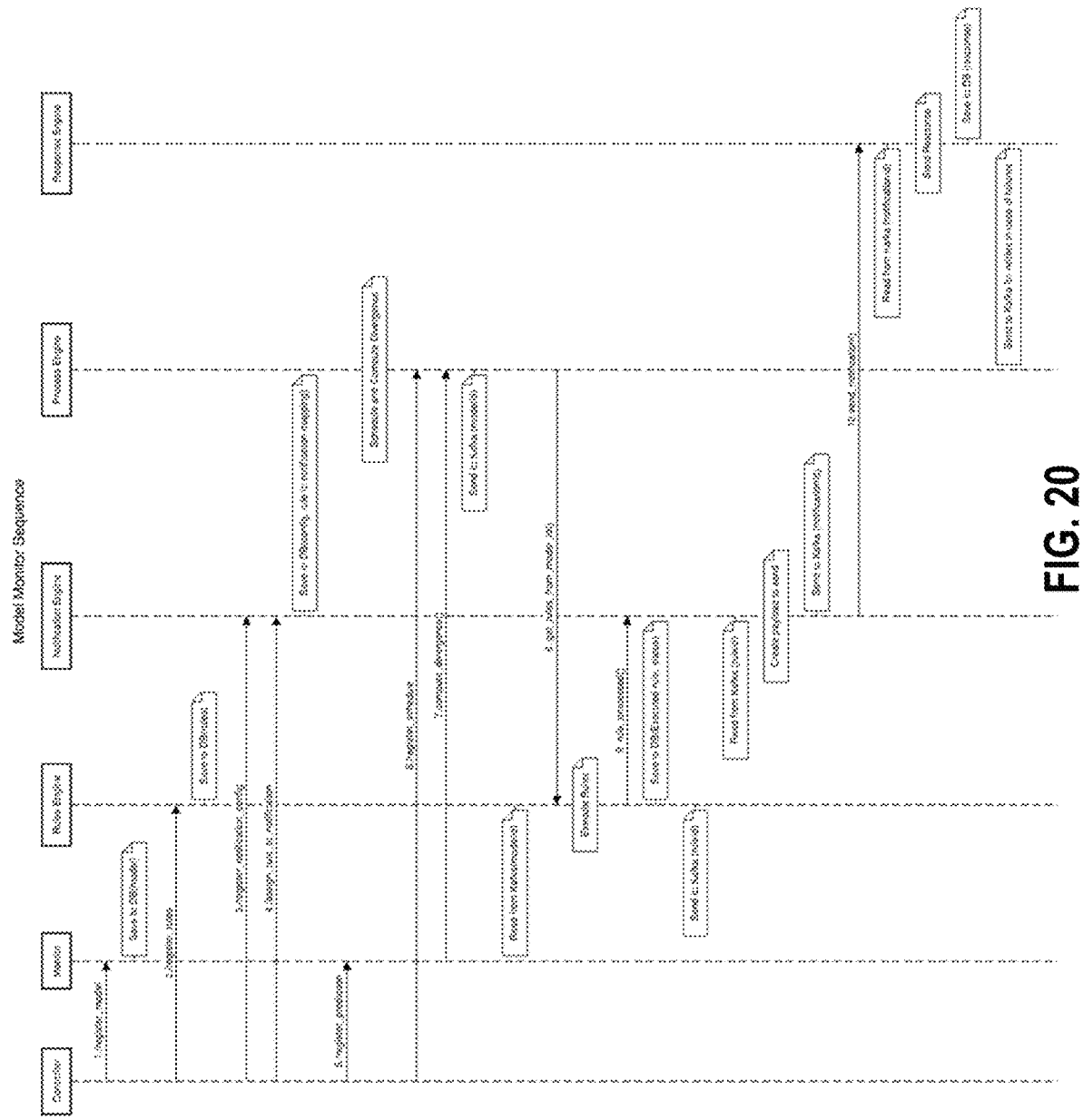
FIG. 20 shows an example of model monitoring sequence and communications among the various components in the model monitoring system.

FIG. 19 schematically shows architecture of a model monitoring system of the model management platform, in accordance with embodiments of the invention. The model monitoring system may be a component of the model management system or a stand-alone system. In some embodiments, the model monitoring system may comprise a process engine configured for computing a drift, a rule engine configured for managing rules for determining a drift, a notification engine configured for notifying a detected model drift, a model monitoring module for monitoring models, and a scheduler. FIG. 20 shows an example of model monitoring sequence and communications among the various components in the model monitoring system. For instance, when a rule is registered, the front-end may call the rules engine to register the rule and save the rule in a rule database. The model monitoring module may listen to new prediction events and upon receiving a new prediction, the rules engine may process rules associated with the model.

Referring back to FIG. 19, the model monitoring module may comprise one or more components configured for monitoring models. In some cases, the model monitoring module may comprise a register model unit, a register prediction unit, a register alert threshold unit, a register notification channels unit and various others. The register model unit and register prediction unit may be configured to monitor model data and model performance as described above.

The register alert threshold unit may be configured to register rules. The rules may be used for determining a model drift. In an example, a rule may be registered with respect to a model ID, thresholds such as time period, predicate logic and various others. A registered rule may be assigned a unique rule ID. The register notification channels unit may be configured to register notifications. A notification may be registered based on the type of communication channel used. A registered notification may be assigned a unique notification ID. It should be noted that a model may be associated with one or more rules, and each rule may be delivered via one or more notification channels (e.g., Slack, email, SMS, etc).

As aforementioned, a user may be allowed to define rules for detecting a model drift and/or setting an alert. A graphical user interface (GUI) (e.g., shown in FIG. 7) may permit a user to set up rules for determining a model drift. For example, a user may set one or more rules by setting up one or more thresholds and metrics. A user may select one or more metrics and one or more thresholds via a dropdown menu provided within the GUI. In some cases, rules provided by a user via the GUI may be registered by the register alert thresholds unit.

The notification engine may be configured to generate and send notifications/alerts. The alert may be delivered in any suitable forms (e.g., audio, visual alert in a GUI, webhooks that can be integrated into other applications, etc) or via any suitable communication channels (e.g., email, Slack, SMS). The notification engine may receive a message indicating a detected model drift, and in response to receiving the message, the notification engine may generate a notification and send the notification to a user.

The rules engine is configured to process rules. In some cases, the rules engine may process rules upon detection of pre-determined events. For instance, the rules engine may listen to the event that a new prediction is registered. Upon receipt of such event, the rules engine may process the associated rules. Additionally or alternatively, the rules engine may process rules according to a pre-determined schedule. In some instances, the rules engine may send processed rules to a Monitor Queue.

The process engine is configured for computing a model drift. In some cases, the drift may be calculated based on the data captured by the model monitoring unit and one or more metrics as specified by the rules. The results may be pushed to a queue managed by the scheduler. The results may be further forwarded to the rules engine and/or notification engine to alert detection of a drift.

Figure 21B:
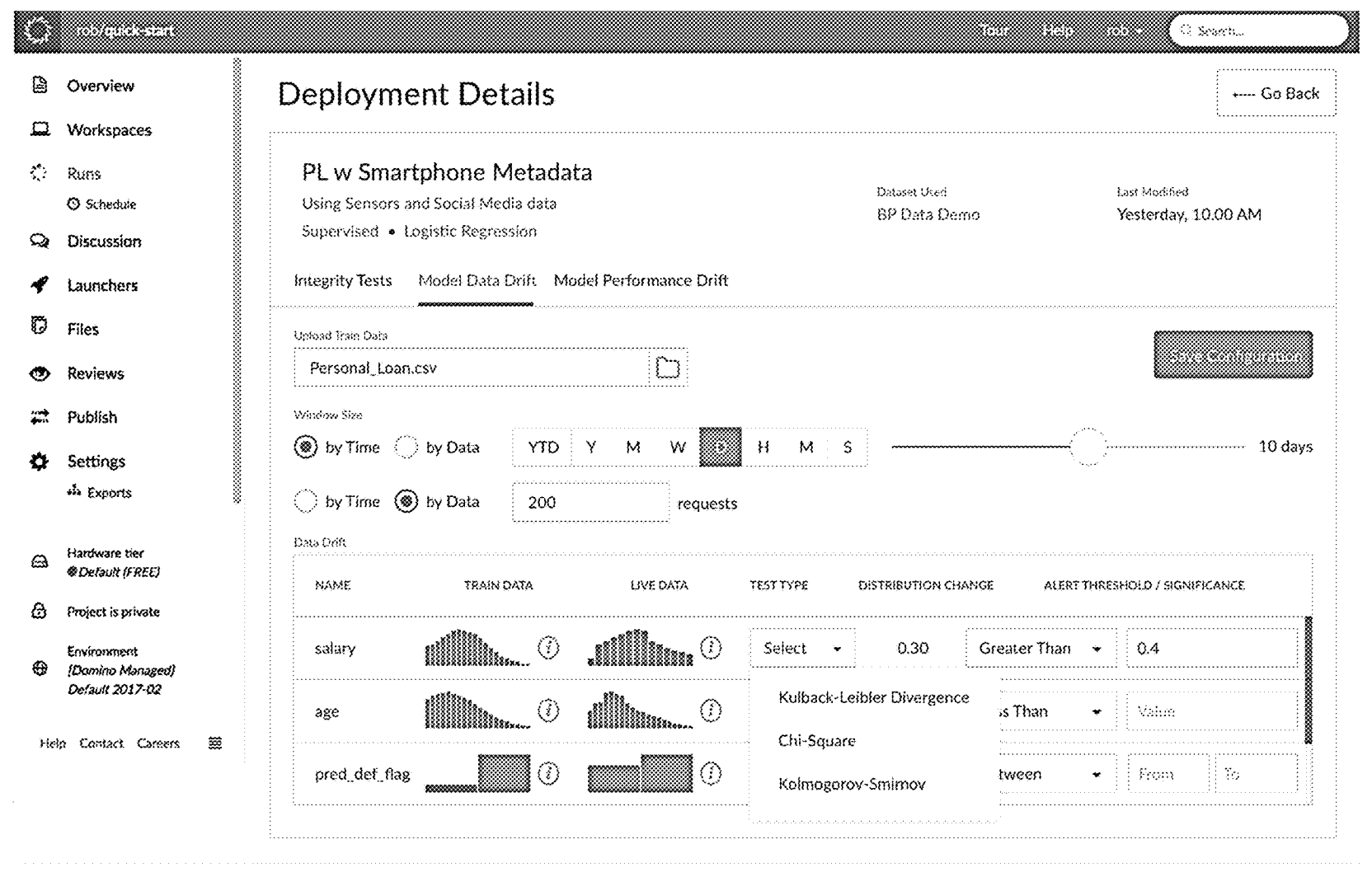
Figure 21C:
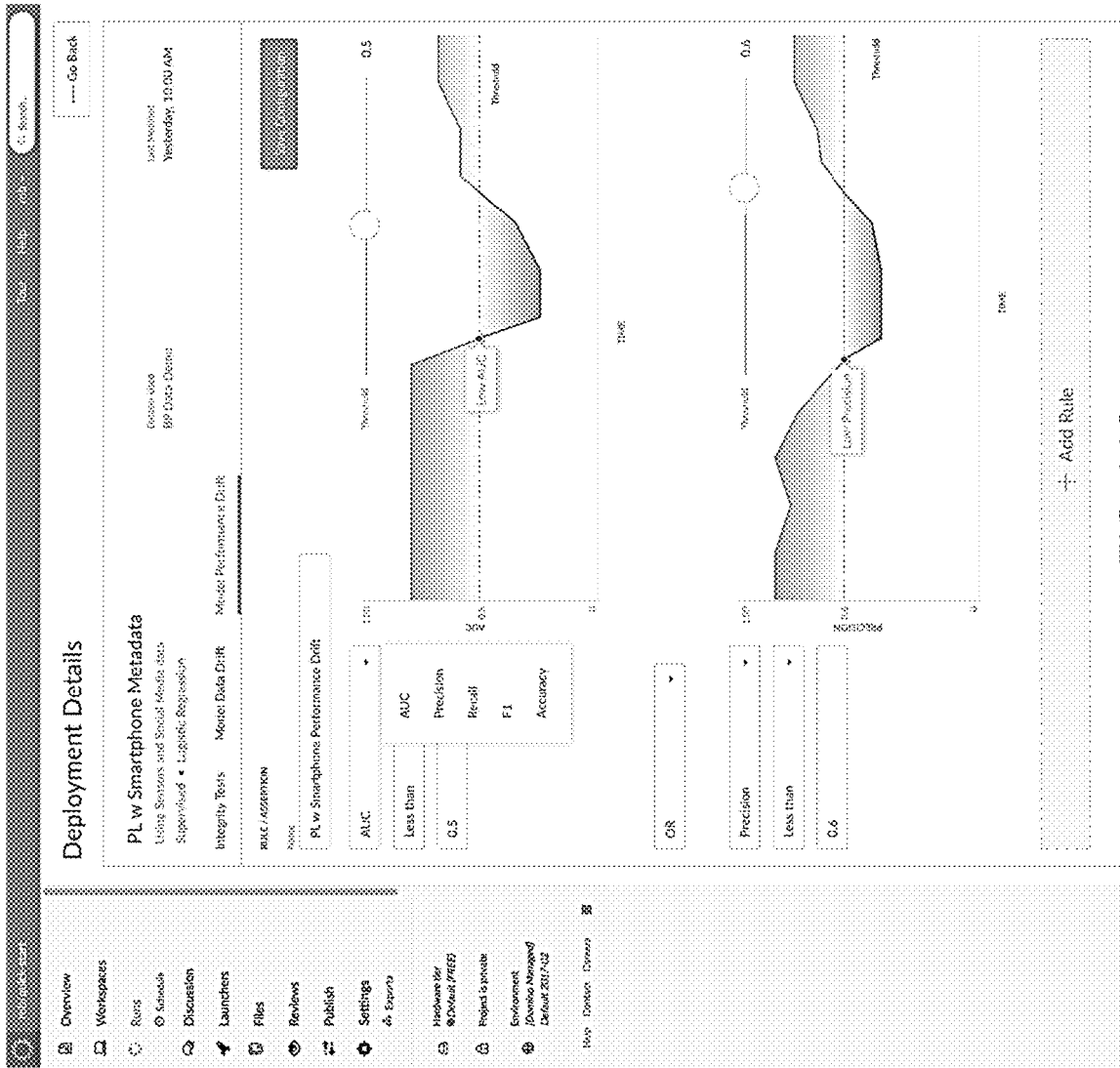

FIGS. 21A-C show exemplary GUIs for displaying information related to model data drift and model performance drift. In some embodiments, the performance of a model, model data, drift in a model may be displayed in a single user interface. In some cases, a user may be permitted to drill down to view further analysis to explore cause of the drift. In some embodiments, model data drift and model performance drift are provided on switchable user interfaces. In some cases, a user may select to view the model performance or model drift in one or more user selectable formats (e.g., temporal view, a distribution view, etc).

In some cases, upon detecting a drift, the model may be automatically re-validated and deployed again to re-train. Additionally or alternatively, the model may be re-validated or re-trained upon receiving a user instruction.

It should be noted that application of the provided methods and systems are not limited by the underlying computing infrastructure or computing environment. For instance, the provided model management system and/or model monitoring system may be applied to grid computing platform or systems utilizing various technologies such as mesh computing, peer-to-peer computing, autonomic (self-healing) computing, wireless sensor networks, mobile data acquisition, mobile signature analysis, cooperative distributed peer-to-peer ad hoc networking and processing, local cloud/fog computing and grid/mesh computing, dew computing, mobile edge computing, cloudlet, distributed data storage and retrieval, remote cloud services, augmented reality and the like. It is understood in advance that although this specification includes description of cloud computing, implementation of the teachings recited herein are not limited to a cloud computing environment. Rather, embodiments of the present invention are capable of being implemented in conjunction with any other types of computing environment now known or later developed.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for managing a plurality of machine learning models, the system comprising:
   an electronic display with a graphical user interface comprising:
   (i) one or more interactive elements for receiving a user input, wherein the user input comprises one or more edits to a rule for viewing statistics about one or more of the plurality of machine learning models,
   (ii) a result visualization region for dynamically displaying a result of the statistics in response to receiving the one or more edits; and
   one or more computer processors that are programmed to provide an application comprising:
   (i) a first software module configuring the graphical user interface for providing statistics about an execution of a selected machine learning model and a linkage between the execution of the selected machine learning model and a selected version of the machine learning model developed on the system;
   (ii) a second software module configuring the graphical user interface for displaying statistics about a usage and cost of the plurality of machine learning models; and
   (iii) a third software module configuring the graphical user interface for setting up a rule to detect a model performance drift or a model data drift.

2. The system of claim 1, wherein the statistics about the one or more of the plurality of machine learning models comprises a number of reused components, revisions per month, on insights created.

3. The system of claim 1, wherein
   the application further comprises:
   (iv) a fourth software module for capturing multiple components related to a training process and a deployment process of the plurality of machine learning models, wherein the multiple components comprise a computing environment component and the fourth software module captures different computing environments at different time points within which at least one of the plurality of machine learning modes is operated.

4. The system of claim 3, wherein the computing environment is in the form a containerized environment.

5. The system of claim 4, wherein the multiple components comprise a set of model dependencies including at least data, code, package or tools that are re-usable across the plurality of machine learning models.

6. The system of claim 4, wherein the captured multiple components are utilized to reconstruct a computing environment corresponding to a time point selected from the different time points.

7. The system of claim 4, wherein the containerized environment allows for re-usable and revisioned computing environments.

8. The system of claim 5, wherein the set of model dependencies is displayed as a model dependency graph that shows the multiple components and mappings across the plurality of machine learning models.

9. A method for managing a plurality of machine learning models, the method comprising:
   receiving a user input via one or more interactive elements within a graphical user interface (GUI), wherein the user input comprises one or more edits to a rule for viewing statistics about one or more of the plurality of machine learning models;
   dynamically displaying a result of the statistics in response to receiving the one or more edits;
   wherein the GUI is configured to display (i) statistics about an execution of a selected machine learning model and a linkage between the execution of the selected machine learning model and a selected version of the machine learning model developed on the system, (ii) statistics about a usage and cost of the plurality of machine learning models and (iii) an interface for setting up a rule to detect a model performance drift or a model data drift.

10. The method of claim 9, wherein the statistics about the one or more of the plurality of models comprises a number of reused components, revisions per month, or insights created.

11. The method of claim 9, wherein the drift is detected based at least in part on a threshold set up by the rule.

12. The method of claim 9, further comprising:
   capturing, with aid of a fourth software module, multiple components related to a training process and a deployment process of the plurality of machine learning models, wherein the multiple components comprise a computing environment component and the different computing environments are captured at different time points within which at least one of the plurality of machine learning modes is operated.

13. The method of claim 12, wherein the computing environment is in the form a containerized environment.

14. The method of claim 13, wherein the multiple components comprise a set of model dependencies including at least data, code, package or tools that are re-usable across the plurality of machine learning models.

15. The method of claim 13, wherein the set of model dependencies is displayed as a model dependency graph that shows the multiple components and mappings across the plurality of machine learning models.

16. The method of claim 13, wherein the captured multiple components are utilized to reconstruct a computing environment corresponding to a time point selected from the different time points.

17. The method of claim 13, wherein the containerized environment allows for re-usable and revisioned computing environments.

* * * * *